(12) United States Patent
Ishizaki et al.

(10) Patent No.: US 10,088,932 B2
(45) Date of Patent: *Oct. 2, 2018

(54) DISPLAY PANEL WITH TOUCH DETECTOR, TOUCH PANEL, AND ELECTRONIC UNIT

(71) Applicant: Japan Display Inc., Tokyo (JP)

(72) Inventors: Koji Ishizaki, Tokyo (JP); Koji Noguchi, Tokyo (JP); Masanobu Ikeda, Tokyo (JP); Yasuyuki Matsui, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,621

(22) Filed: Mar. 7, 2017

(65) Prior Publication Data

US 2017/0177132 A1 Jun. 22, 2017

Related U.S. Application Data

(63) Continuation of application No. 14/694,492, filed on Apr. 23, 2015, now Pat. No. 9,626,022, which is a
(Continued)

(30) Foreign Application Priority Data

Apr. 22, 2011 (JP) .................................. 2011-096021

(51) Int. Cl.
*G02F 1/1333* (2006.01)
*G02F 1/1343* (2006.01)
(Continued)

(52) U.S. Cl.
CPC ........ *G06F 3/0412* (2013.01); *G02F 1/13338* (2013.01); *G02F 1/133707* (2013.01); *G02F 1/134309* (2013.01); *G06F 3/044* (2013.01)

(58) Field of Classification Search
CPC .... G06F 3/0412; G06F 3/044; G02F 1/13338; G02F 1/133707; G02F 1/134309
See application file for complete search history.

(56) References Cited

U.S. PATENT DOCUMENTS

2009/0315854 A1   12/2009   Matsuo
2010/0214262 A1   8/2010   Ishizaki et al.
(Continued)

FOREIGN PATENT DOCUMENTS

CN   10-1814256 A   8/2010
JP   2010-197576   9/2010
KR   10-2010-0097018 A   9/2010

OTHER PUBLICATIONS

Korean Office Action dated Nov. 21, 2017 for corresponding Korean Patent Application No. 10-2012-0034854.
(Continued)

*Primary Examiner* — Nathanael R Briggs
(74) *Attorney, Agent, or Firm* — Michael Best & Friedrich LLP

(57) ABSTRACT

There are provided a display panel with a touch detector that allows the touch detection electrodes to be less visible, a touch panel, and an electronic unit having the display panel with a touch detector. The display panel with a touch detector includes: a display layer including a plurality of display elements arranged side by side; and an electrode layer alternately segmented into first regions and second regions along a first direction, the electrode layer including a plurality of first slits arranged side by side to extend in a second direction, and a plurality of second slits each allowing an adjacent pair of the plurality of first slits in the second regions to be in communication with one another.

20 Claims, 25 Drawing Sheets

Related U.S. Application Data continuation of application No. 13/426,783, filed on Mar. 22, 2012, now Pat. No. 9,036,094.

(51) Int. Cl.
*G06F 3/041* (2006.01)
*G06F 3/044* (2006.01)
*G02F 1/1337* (2006.01)

(56) References Cited

U.S. PATENT DOCUMENTS

2010/0328268 A1* 12/2010 Teranishi .............. G06F 3/0412
    345/175
2013/0278528 A1    10/2013    Ishizaki et al.

OTHER PUBLICATIONS

Chinese Office Action dated Nov. 16, 2015, for corresponding Chinese Patent Application No. 2012-101130107.

* cited by examiner

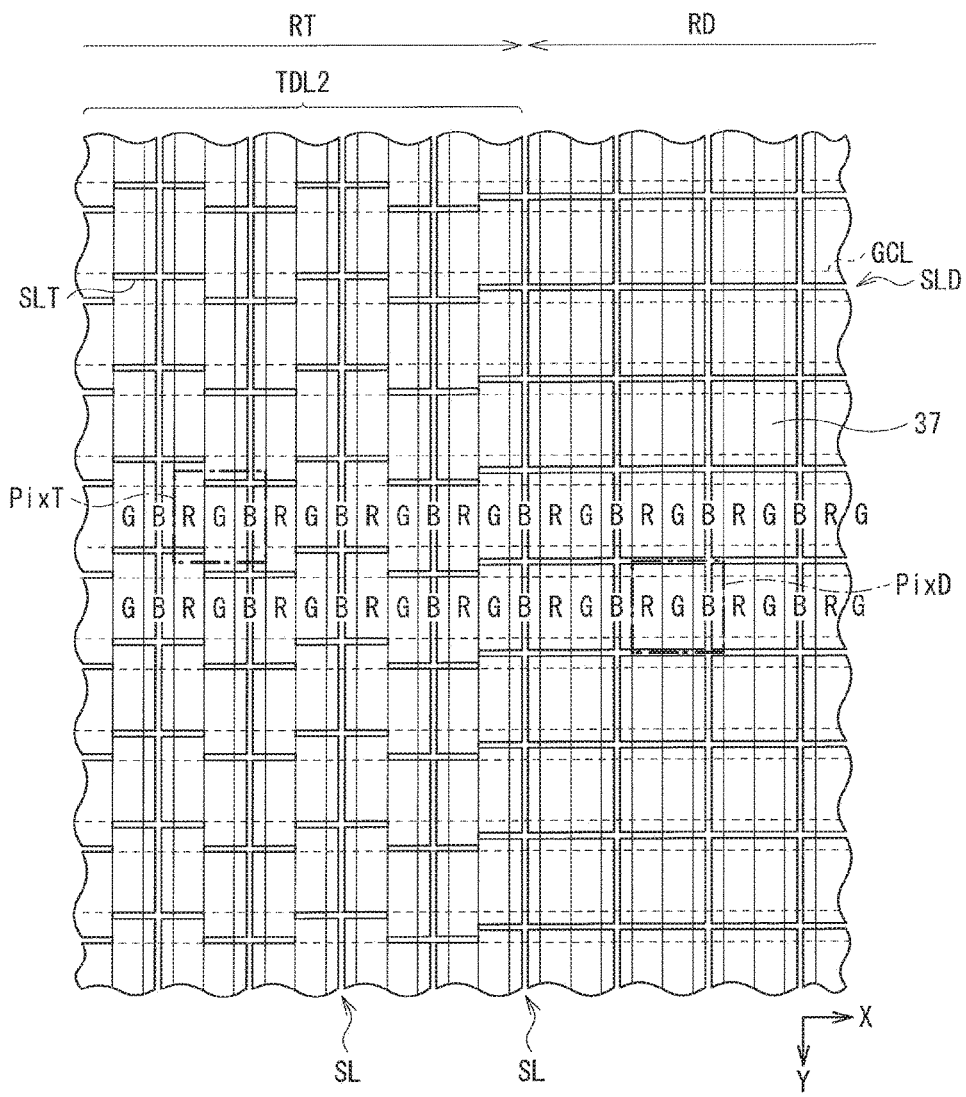
F I G. 14

DISPLAY PANEL WITH TOUCH DETECTOR, TOUCH PANEL, AND ELECTRONIC UNIT

CROSS REFERENCES TO RELATED APPLICATIONS

The present application is a Continuation of application Ser. No. 14/694,492, filed Apr. 23, 2015, which is a Continuation of application Ser. No. 13/426,783, filed Mar. 22, 2012, now U.S. Pat. No. 9,036,094, issued May 19, 2015, which claims priority to Japanese Patent Application JP 2011-096021 filed in the Japanese Patent Office on Apr. 22, 2011. The entire contents of these applications are incorporated herein by reference.

BACKGROUND

The present disclosure relates to a display panel with a touch detector having a function of detecting a touch event due to an external proximity object based on a change in capacitance, a touch panel, and an electronic unit having the display panel with a touch detector.

Recently, a display panel has been notified, where a touch detection device, a so-called touch panel, is mounted on a display such as a liquid crystal display, or the touch panel is integrated with the display, and various button images and the like are displayed on the display for inputting information, instead of typical mechanical buttons. Such a display panel having the touch panel does not need an input device such as a keyboard, a mouse, and a keypad and therefore tends to be expansively used not only for computers but also for handheld information terminals such as mobile phones.

A type of the touch panel includes several types such as an optical type and a resistant type. In particular, a capacitance-type touch panel has been promising as a device allowing low power consumption with a relatively simple structure. For example, Japanese Unexamined Patent Application Publication No. 2010-197576 discloses a display with a touch detector having a plurality of counter electrodes (drive electrodes) and a plurality of detection electrodes (touch detection electrodes) crossing the counter electrodes, which detects a touch event based on a change in capacitance, formed at each of the intersections of the counter electrodes and the detection electrodes, due to an external proximity object. In the display with a touch detector, for example, the touch detection electrodes are arrayed at a pitch a natural number times as large as a pitch of arranged pixels, and therefore the touch detection electrodes are allowed to be less visible.

SUMMARY

In such a touch panel, the touch detection electrodes are desirably substantially not visible, and are promisingly further less visible.

It is desirable to provide a display panel with a touch detector that allows the touch detection electrodes to be less visible, a touch panel, and an electronic unit having the display panel with a touch detector.

According to an embodiment of the disclosure, there is provided a display panel with a touch detector, including a display layer including a plurality of display elements arranged side by side; and an electrode layer alternately segmented into first regions and second regions along a first direction, the electrode layer including a plurality of first slits arranged side by side to extend in a second direction, and a plurality of second slits each allowing an adjacent pair of the plurality of first slits in the second regions to be in communication with one another.

According to an embodiment of the disclosure, there is provided a touch panel including an electrode layer alternately segmented into first regions and second regions along a first direction, the electrode layer including a plurality of first slits arranged side by side to extend in a second direction, and a plurality of second slits allowing the adjacent first slits in the second regions to be in communication with one another.

According to an embodiment of the disclosure, there is provided an electronic unit including a display panel with a touch detector, and a control section that performs operation control using the display panel with a touch detector, the display panel including: a display layer including a plurality of display elements arranged side by side, and an electrode layer alternately segmented into first regions and second regions along a first direction, the electrode layer including a plurality of first slits arranged side by side to extend in a second direction, and a plurality of second slits each allowing an adjacent pair of the plurality of first slits in the second regions to be in communication with one another. The electronic unit includes, for example, a television apparatus, a digital camera, a personal computer, a video camera, and a mobile terminal device such as a mobile phone.

In the display panel with a touch detector, the touch panel, and the electronic unit according to the embodiments of the disclosure, the first slits extending in the second direction are arranged side by side in the first and second regions of the electrode layer. In the second regions, the adjacent first slits are in communication with one another through the second slits.

According to the display panel with a touch detector, the touch panel, and the electronic unit of the embodiments of the disclosure, the first slits are arranged side by side in the first and second regions of the electrode layer, and the adjacent first slits are in communication with one another through the second slits in the second regions, thereby allowing the touch detection electrodes to be less visible.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 14 is a plan view illustrating an exemplary configuration of electrode layouts in a touch detection electrode region and a dummy electrode region according to a second embodiment.

DETAILED DESCRIPTION OF EMBODIMENTS

Hereinafter, embodiments of the disclosure will be described in detail with reference to the accompanying drawings. It is to be noted that description is made in the following order.
1. Basic Principle of Capacitance-Type Touch Detection
2. First Embodiment
3. Second Embodiment
4. Third Embodiment
5. Fourth Embodiment
6. Fifth Embodiment
7. Application Examples 1. Basic Principle of Capacitance-Type Touch Detection First, a basic principle of touch detection of a display panel with a touch detector according to the disclosure is described with reference to FIGS. 1 to 3. This touch detection process is embodied as a capacitance-type touch sensor. In the capacitance-type touch sensor, for example, a pair of electrodes (a drive electrode E1 and a touch detection electrode E2) disposed to face each other with a dielectric body D in between are used to define a capacitance element, as illustrated in (A) of FIG. 1. Such a structure is expressed as an equivalent circuit illustrated in (B) of FIG. 1. The drive electrode E1, the touch detection electrode E2, and the dielectric body D define a capacitance element C1. One end of the capacitance element C1 is connected to an AC signal source (drive signal source) S, and the other end P is grounded through a resistor R and connected to a voltage detector (touch detection section) DET. After an AC rectangular wave Sg ((B) of FIG. 3) having a predetermined frequency (for example, approximately several kilohertz to several tens kilohertz) is applied from the AC signal source S to the drive electrode E1 (one end of the capacitance element C1), an output waveform (a touch detection signal Vdet) as illustrated in (A) of FIG. 3 is shown at the touch detection electrode E2 (the other end P of the capacitance element C1). It is to be noted that the AC rectangular wave Sg corresponds to a drive signal Vcom described below.

Figure 1:
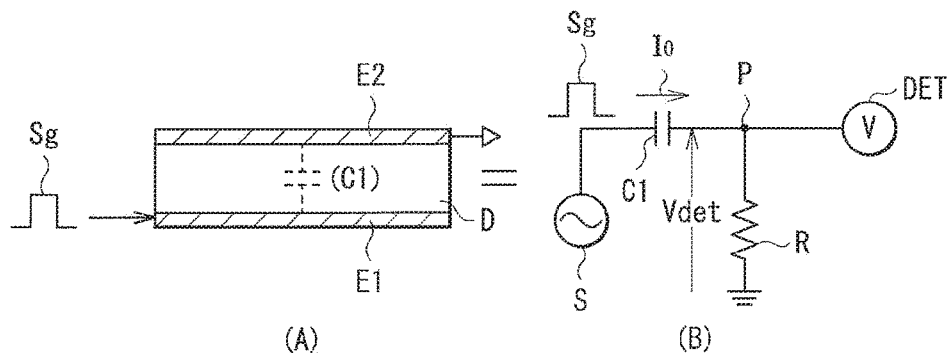
FIG. 1 is a diagram for explaining a basic principle of a touch detection process of a display panel with a touch detector according to embodiments of the disclosure, showing a state where a finger is not in contact with or not in proximity to the display panel.

In the state where a finger is not in contact with (or not in proximity to) the display panel, a current I0 corresponding to a capacitance value of the capacitance element C1 flows in response to charge and discharge with respect to the capacitance element C1 as illustrated in FIG. 1. Here, a potential waveform at the other end P of the capacitance element C1 is, for example, as shown by a waveform V0 in (A) of FIG. 3, which is detected by the voltage detector DET.

Figure 2:
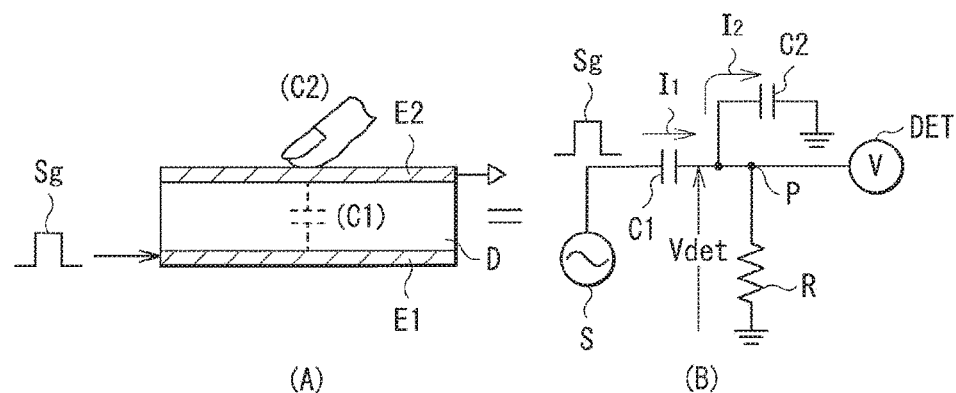
FIG. 2 is a diagram for explaining the basic principle of the touch detection process of the display panel with a touch detector according to the embodiments of the disclosure, showing a state where a finger is in contact with or in proximity to the display panel.
Figure 3:
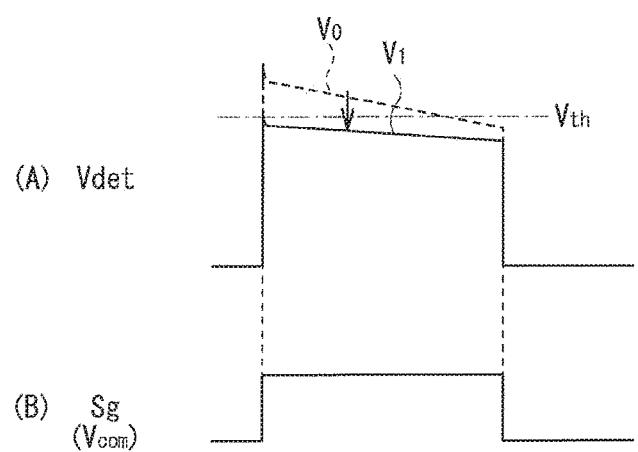
FIG. 3 is a diagram for explaining the basic principle of the touch detection process of the display panel with a touch detector according to the embodiments of the disclosure, showing exemplary waveforms of a drive signal and a touch detection signal.

In contrast, in the state where a finger is in contact with (or in proximity to) the display panel, a capacitance element C2 is formed by a finger and added in series to the capacitance element C1 as illustrated in FIG. 2. In this state, a current I1 and a current I2 flow in response to charge and discharge with respect to the capacitance elements C1 and C2, respectively. Here, a potential waveform at the other end P of the capacitance element C1 is, for example, as shown by a waveform V1 in (A) of FIG. 3, which is detected by the voltage detector DET. Here, electric potential of the point P corresponds to a divided potential determined by the values of the currents I1 and I2 flowing through the respective capacitance elements C1 and C2. As a result, the waveform V1 has a small value compared with the waveform V0 in the non-contact state. The voltage detector DET compares the detected voltage with a predetermined threshold voltage Vth. If the detected voltage is equal to or higher than the threshold voltage, the voltage detector DET determines that no contact occurs. If the detected voltage is lower than the threshold voltage, the voltage detector DET determines that some contact occurs. In this way, touch detection is performed.

2. First Embodiment

[Exemplary Configuration]
(Exemplary Overall Configuration)

Figure 4:
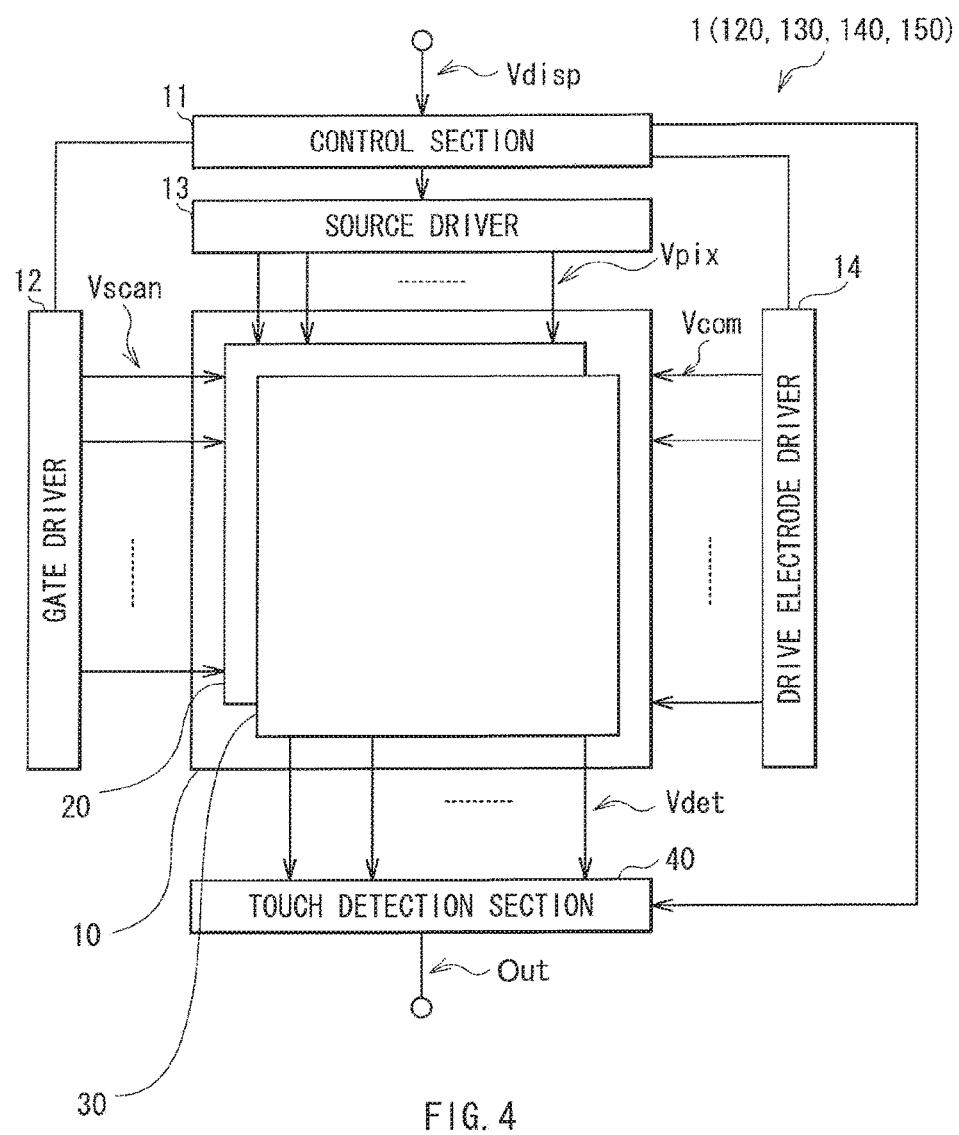
FIG. 4 is a block diagram illustrating an exemplary configuration of a display panel with a touch detector according to an embodiment of the disclosure.

FIG. 4 illustrates an exemplary configuration of a display panel with a touch detector according to a first embodiment of the disclosure. Since a touch panel according to the embodiments of the disclosure is embodied by the first embodiment, the touch panel is described together. The display panel with a touch detector includes liquid crystal display elements as display elements, and is of a so-called in-cell type, in which a liquid crystal display device configured of the liquid crystal display elements is integrated with a capacitance-type touch detection device.

The display panel with a touch detector 1 includes a control section 11, a gate driver 12, a source driver 13, a drive electrode driver 14, a display device with a touch detector 10, and a touch detection section 40.

The control section 11 is a circuit that supplies a control signal to each of the gate driver 12, the source driver 13, the drive electrode driver 14, and the touch detection section 40 based on a video signal Vdisp supplied from the outside, and controls the components to operate in synchronization with one another.

The gate driver 12 has a function of sequentially selecting one horizontal line as a display drive object of the display device with a touch detector 10 based on the control signal supplied from the control section 11. In detail, the gate driver 12 applies, through scan signal lines GCL, scan signals Vscan to gates of TFT elements Tr of pixels Pix, which are provided in a matrix in a liquid crystal display device 20 of the display device with a touch detector 10, to sequentially select one row (one horizontal line) as a display drive object of the pixels Pix, as described below.

The source driver 13 is a circuit that supplies pixel signals Vpix to the pixels Pix (described below) of the display device with a touch detector 10 based on the control signal supplied from the control section 11. In detail, the source driver 13 supplies, through pixel signal lines SGL, the pixel signals Vpix to the pixels Pix defining one horizontal line, which is sequentially selected by the gate driver 12, as described below. The pixels Pix perform display for the one horizontal line in response to the supplied pixel signals Vpix.

The drive electrode driver 14 is a circuit that supplies the drive signals Vcom to drive electrodes COML (described below) of the display device with a touch detector 10 based on the control signal supplied from the control section 11. In detail, the drive electrode driver 14 sequentially applies the drive signals Vcom to the drive electrodes COML in a time-divisional manner. A touch detection device 30 outputs touch detection signals Vdet based on the drive signals Vcom from a plurality of touch detection electrodes TDL (described below) to the touch detection section 40.

The display device with a touch detector 10 is a display device in which a touch detection function is embedded. The display device with a touch detector 10 includes the liquid crystal display device 20 and the touch detection device 30. The liquid crystal display device 20 is a device that performs sequential scan by one horizontal line basis for performing display in response to the scan signals Vscan supplied from the gate driver 12, as described below. The touch detection device 30 operates on the basis of the above-described basic principle of the capacitance-type touch detection and outputs the touch detection signals Vdet. The touch detection device 30 performs sequential scan in response to the drive signals Vcom supplied from the drive electrode driver 14 to perform touch detection, as described 1 below.

The touch detection section 40 detects presence of a touch event in the touch detection device 30 based on the control signal supplied from the control section 11 and the touch detection signals Vdet supplied from the touch detection device 30 of the display device with a touch detector 10, and determines the coordinates of a touch event in a touch detection region if the touch event is detected, and outputs the determined result as an output signal Out.

(Display Device with Touch Detector 10)

An exemplary configuration of the display device with a touch detector 10 is now described in detail.

Figure 5:
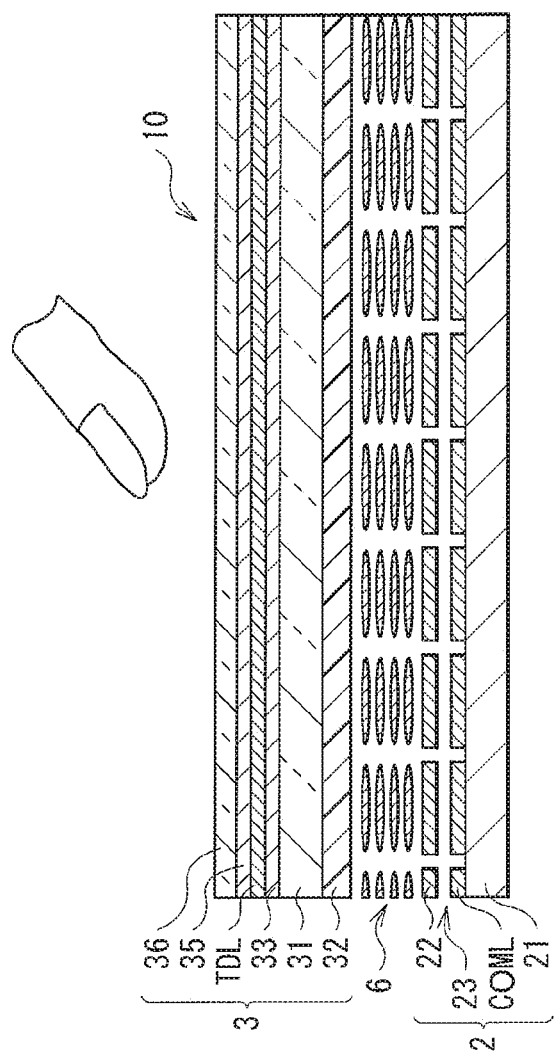
FIG. 5 is a sectional diagram illustrating a schematic sectional structure of a display device with a touch detector shown in FIG. 4.

FIG. 5 illustrates an exemplary sectional structure of a major part of the display device with a touch detector 10. The display device with a touch detector 10 includes a pixel substrate 2, a counter substrate 3 disposed to face the pixel substrate 2, and a liquid crystal layer 6 interposed between the pixel substrate 2 and the counter substrate 3.

The pixel substrate 2 includes a TFT substrate 21 as a circuit substrate, the drive electrodes COML, and pixel electrodes 22. The TFT substrate 21 functions as a circuit substrate on which various kinds of electrodes, wirings, and thin film transistors (TFTs) are provided. The TFT substrate 21 is configured of, for example, glass. The drive electrodes COML are provided on the TFT substrate 21. The drive electrodes COML are electrodes for supplying the common voltage to a plurality of pixels Pix (described below). The drive electrodes COML function as common drive electrodes for liquid crystal display operation, and also function as the drive electrodes for touch detection operation. While the drive electrodes are commonly used for display and touch detection herein, the drive electrodes may be separately provided for respective operations. An insulating layer 23 is provided on the drive electrodes COML, and the pixel electrodes 22 are provided on the insulating layer 23. The pixel electrodes 22 are translucent electrodes to be supplied with the pixel signals for display. The drive electrodes COML and the pixel electrodes 22 include, for example, indium tin oxide (ITO).

The counter substrate 3 includes a glass substrate 31, a color filter 32, and the touch detection electrodes TDL. The color filter 32 is provided on one surface of the glass substrate 31. The color filter 32 is configured of, for example, color filter layers of three colors of red (R), green (G), and blue (B) arrayed periodically, where a set of the three colors R, G, and B is associated with each display pixel. The color filter 32 is not limited to the three colors of RGB, and, for example, may include a color filter layer of another color, or may include color filter layers of two or less colors or of four or more colors. A translucent layer 33 is provided on the other surface of the glass substrate 31, and a plurality of touch detection electrodes TDL as the detection electrodes of the touch detection device 30 are arranged side by side on the translucent layer 33. Dummy electrodes 37 are provided between the touch detection electrodes TDL in order to allow the touch detection electrodes TDL to be less visible as described below. The touch detection electrodes TDL and the dummy electrodes 37 are translucent electrodes including, for example, ITO, IZO, or SnO. The translucent layer 33 includes an insulating material such as SiN and SiC. The refractive index of the translucent layer 33 has an intermediate value (for example, approximately 1.75 for SiN and approximately 1.6 for SiC) between the refractive index of the glass substrate 31 (for example, approximately 1.5) and the refractive index of the touch detection electrode TDL (for example, approximately 1.8) at a wavelength around 550 nm relevant to a high luminosity factor. The translucent layer 33 is provided as an index matching layer for reducing reflection of light between the glass substrate 31 and the touch detection electrodes TDL. A polarizing plate 35 is provided on the touch detection electrodes TDL, and a cover glass 36 is provided on the polarizing plate 35. While the translucent layer 33 is provided herein, this is not limitative. For example, the translucent layer 33 may be omitted.

The liquid crystal layer 6 acts as a display functional layer that modulates light passing through the liquid crystal layer 6 depending on a state of an electric field. The electric field is formed due to a difference in electric potential between the voltage of each drive electrode COML and the voltage of each pixel electrode 22. A transverse mode of liquid crystal, such as a fringe field switching (FFS) mode and an in-plane switching (IPS) mode, is used for the liquid crystal layer 6.

It is to be noted that an alignment film is provided between the liquid crystal layer 6 and the pixel substrate 2 and between the liquid crystal layer 6 and the counter substrate 3, and an incidence-side polarizing plate is disposed on a bottom of the pixel substrate 2, which are omitted to be shown herein. A circularly polarizing plate or an elliptically polarizing plate is used for the polarizing plate 35 and the incidence-side polarizing plate (not shown).

Figure 6A:
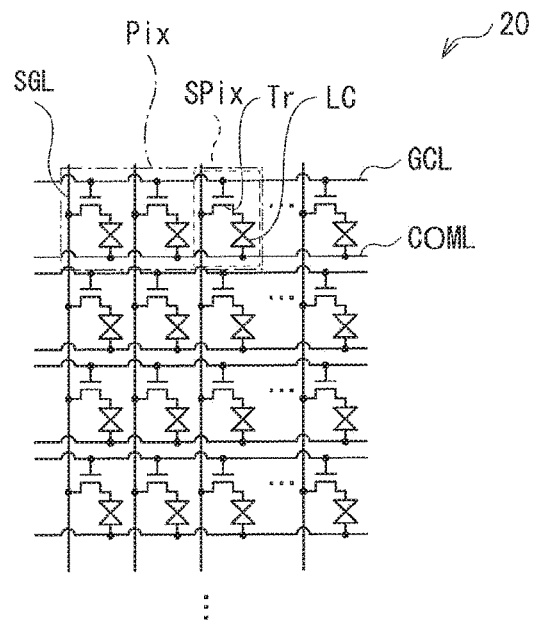
FIGS. 6A and 6B are explanatory diagrams illustrating a pixel arrangement of the display device with a touch detector shown in FIG. 4.
Figure 6B:
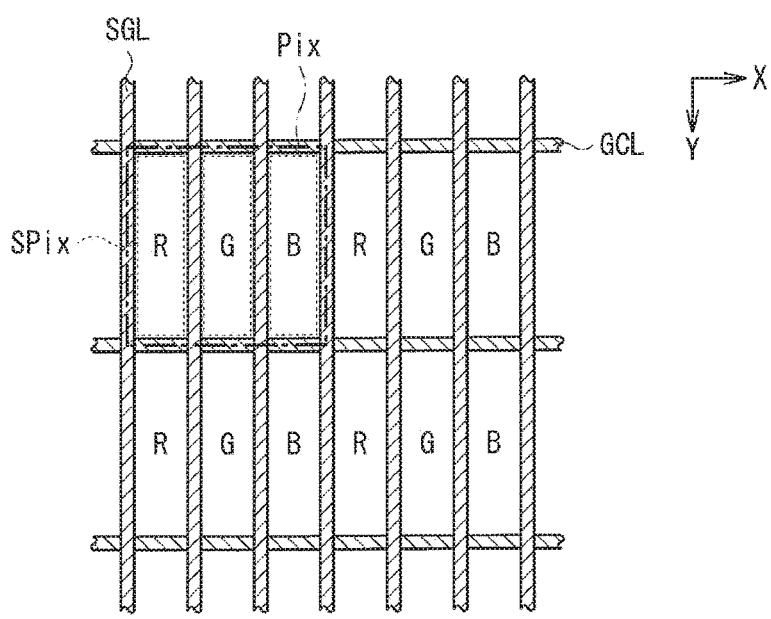

FIGS. 6A and 6B illustrate an exemplary configuration of the liquid crystal display device 20, where FIG. 6A shows a circuit diagram, and FIG. 6B shows a pixel arrangement. The liquid crystal display device 20 has a plurality of pixels Pix arranged in a matrix. Each pixel Pix is configured of three sub-pixels SPix. The respective, three sub-pixels SPix are disposed in correspondence to the three colors R, G, and B of the color filter 32 shown in FIG. 5. Each sub-pixel SPix includes a TFT element Tr and a liquid crystal element LC. The TFT element Tr is configured of a thin film transistor, which is an n-channel metal oxide semiconductor (MOS) TFT herein. A source of the TFT element Tr is connected to the pixel signal line SGL, a gate thereof is connected to the scan signal line GCL, and a drain thereof is connected to the one end of the liquid crystal element LC. The one end of the liquid crystal element LC is connected to the drain of the TFT element Tr, and the other end thereof is connected to the drive electrode COML.

The sub-pixel SPix is connected mutually with other sub-pixels SPix on the same row of the liquid crystal display device 20 through the scan signal line GCL. The scan signal line GCL is connected to the gate driver 12 so as to be supplied with the scan signal Vscan from the gate driver 12. In addition, the sub-pixel SPix is connected mutually with other sub-pixels SPix on the same column of the liquid crystal display device 20 through the pixel signal line SGL. The pixel signal line SGL is connected to the source driver 13 so as to be supplied with the pixel signal Vpix from the source driver 13.

The pixel signal line SGL and the scan signal line GCL are each disposed along boundaries between the adjacent sub-pixels SPix on the pixel substrate 2, as shown in FIG. 6B. In detail, the pixel signal line SGL is disposed along boundaries between adjacent sub-pixels SPix in a horizontal direction (x direction), and the scan signal line GCL is disposed along boundaries between adjacent sub-pixels SPix in a vertical direction (y direction). The pixel signal line SGL and the scan signal line GCL are each configured of a single-layer film or a multilayer film including aluminum, aluminum alloy, molybdenum, and titanium, for example. As a result, light does not pass through the regions of the pixel signal lines SGL and the scan signal lines GCL.

Furthermore, the sub-pixel SPix is connected mutually with other sub-pixels SPix on the same row of the liquid crystal display device 20 through the drive electrode COML. The drive electrode COML is connected to the drive electrode driver 14 so as to be supplied with the drive signal Vcom from the drive electrode driver 14.

According to such a configuration, in the liquid crystal display device 20, the gate driver 12 drives the scan signal lines GCL to be line-sequentially scanned in a time-divisional manner, thereby one horizontal line is sequentially selected, and the source driver 13 supplies the pixel signals Vpix to the pixels Pix on the one horizontal line, so that display is performed by one horizontal line basis.

Figure 7:
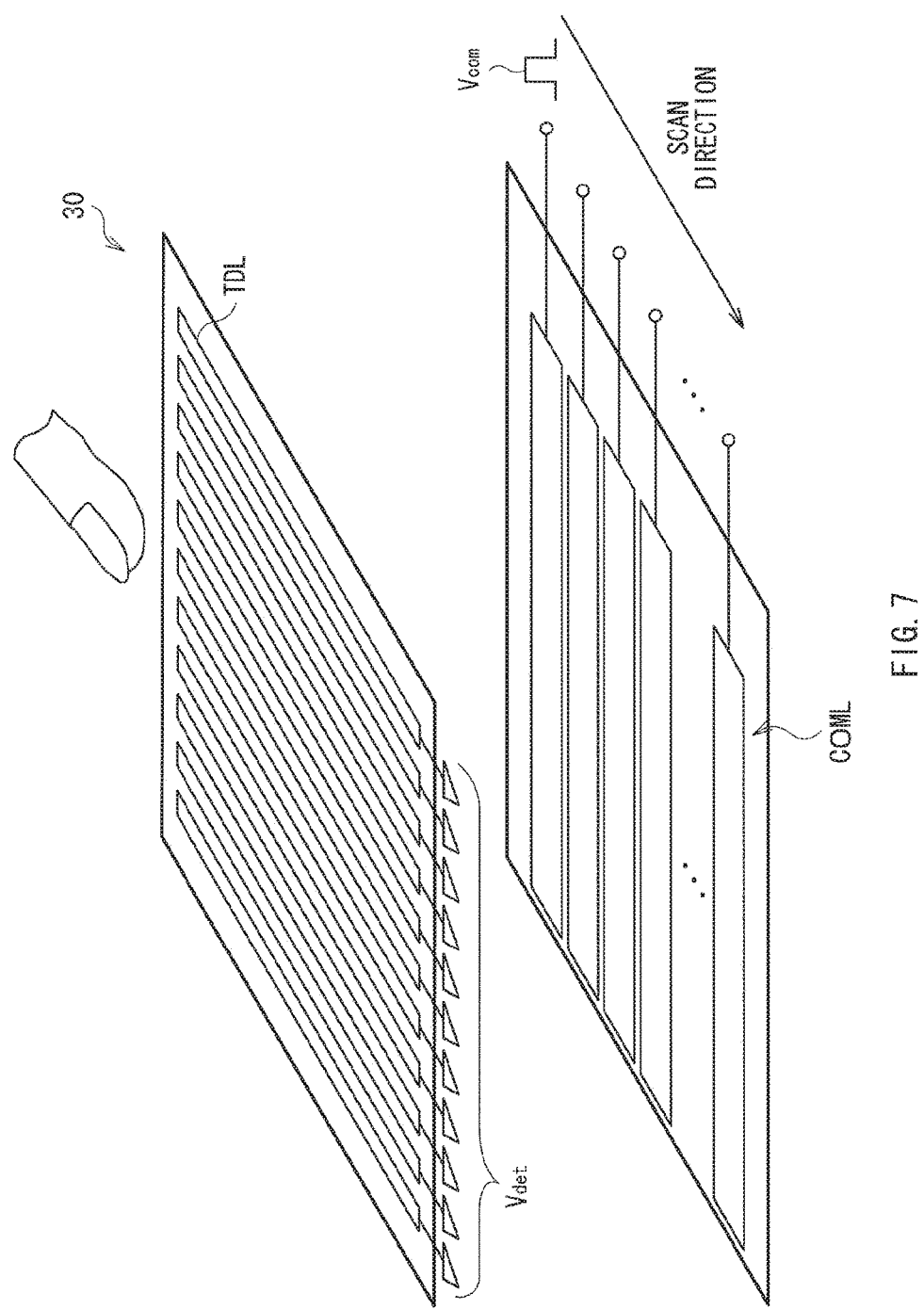
FIG. 7 is a perspective diagram illustrating exemplary configurations of drive electrodes and touch detection electrodes of the display device with a touch detector shown in FIG. 4.

FIG. 7 perspectively illustrates an exemplary configuration of the touch detection device 30. The touch detection device 30 is configured of the drive electrodes COML provided on the pixel substrate 2 and the touch detection electrodes TDL provided on the counter substrate 3. The drive electrodes COML are configured as a plurality of stripe-shaped electrode patterns extending in a horizontal direction in the figure. During the touch detection operation, the drive electrode driver 14 sequentially supplies the drive signals Vcom to the electrode patterns for sequential scan drive of the electrode patterns in a time-divisional manner. The touch detection electrodes TDL are configured of electrode patterns extending in a direction orthogonal to the extending direction of the electrode patterns of the drive electrodes COML. The electrode patterns of the touch detection electrodes TDL are connected to the touch detection section 40. The electrode patterns of the drive electrodes COML intersect the electrode patterns of the touch detection electrodes TDL, thereby resulting in formation of capacitance at respective intersections.

According to such a configuration, in the touch detection device 30, the drive electrode driver 14 applies the drive signals Vcom to the drive electrodes COML, so that the touch detection electrodes TDL output the touch detection signals Vdet for touch detection. Specifically, the drive electrodes COML correspond to the drive electrode E1 in the basic principle of touch detection illustrated in FIGS. 1 to 3, and the touch detection electrodes TDL correspond to the touch detection electrode E2. The touch detection device 30 detects a touch event in accordance with the basic principle. As illustrated in FIG. 7, a capacitance-type touch sensor is formed in a matrix by the electrode patterns intersecting each other. Accordingly, a position of contact or proximity of an external proximity object is detected through scan of the entire touch detection surface of the touch detection device 30.

Figure 8:
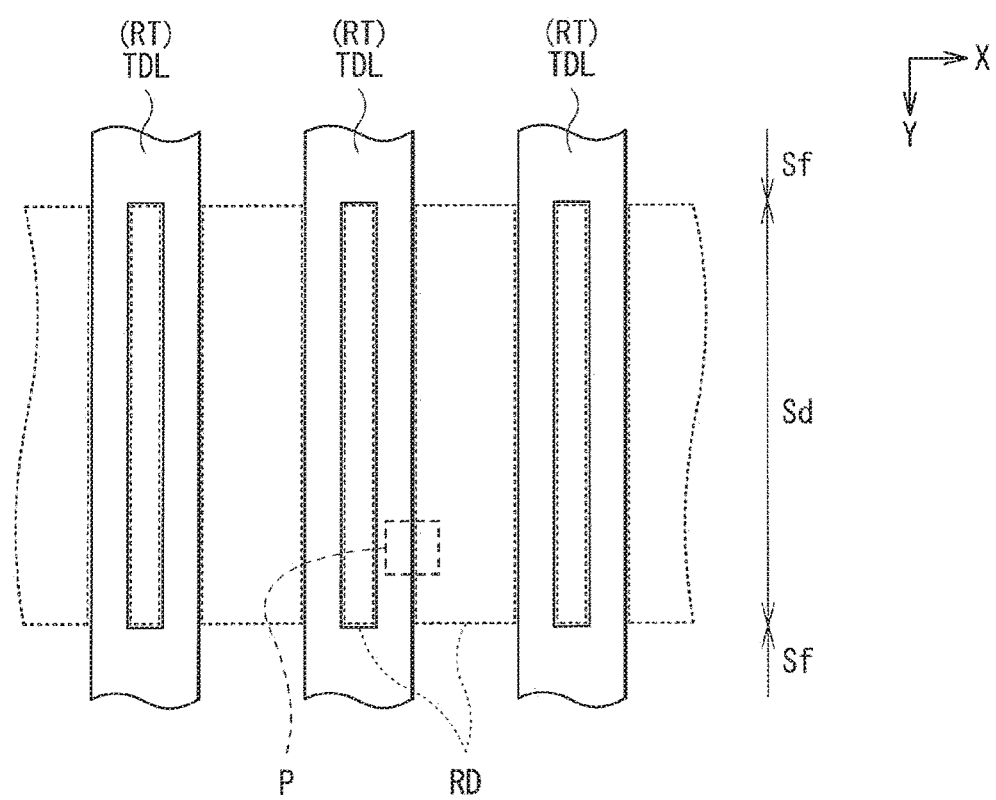
FIG. 8 is a plan view illustrating an exemplary configuration of the touch detection electrodes shown in FIG. 7.

FIG. 8 illustrates an exemplary configuration of the touch detection electrodes TDL. In FIG. 8, each touch detection electrode TDL (touch detection electrode region RT) vertically extends in a y direction across a display region Sd, and is connected to the touch detection section 40 via a frame region Sf in the periphery of the display region Sd through a wiring, for example. The touch detection electrode TDL has a rectangular opening as shown in FIG. 8. A dummy electrode region RD is provided in a region of the opening and in a region between adjacent touch detection electrodes TDL, and a dummy electrode 37 (described below) is provided in each dummy electrode region RD. An electrode layout in an effective pixel region of each pixel Pix is the same between the touch detection electrode region RT and the dummy electrode region RD, as described below.

Figure 9:
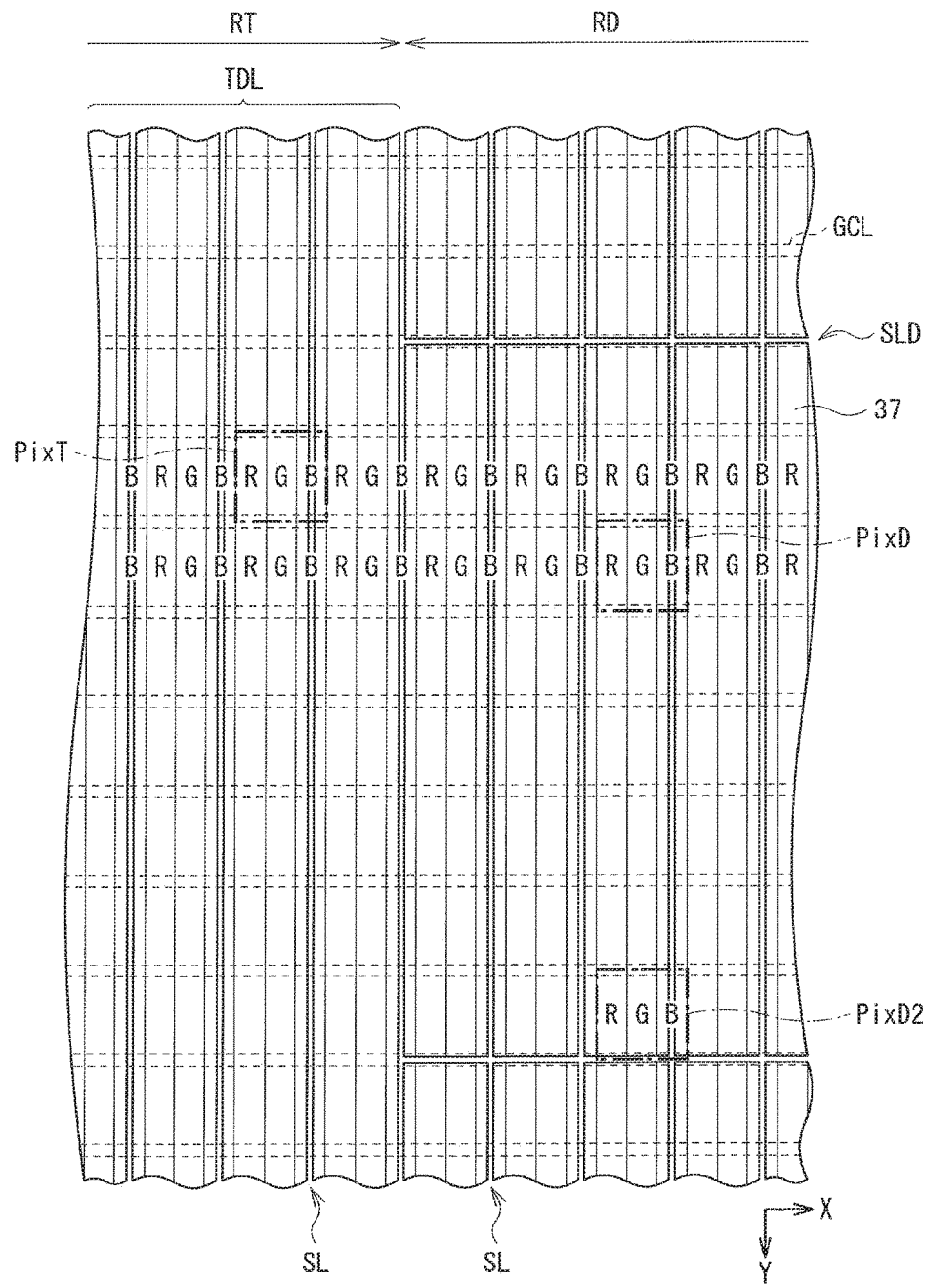
FIG. 9 is a plan view illustrating an exemplary configuration of electrode layouts in a touch detection electrode region and a dummy electrode region according to a first embodiment.

FIG. 9 illustrates an exemplary configuration of the respective electrode layouts in the touch detection electrode region RT and the dummy electrode region RD, showing a portion P shown in FIG. 8 in detail.

In the touch detection electrode region RT, a plurality of electrode patterns are defined by slits SL extending in the vertical direction (y direction) in FIG. 9. The plurality of electrode patterns is bundled in the frame region Sf shown in FIG. 8 into one touch detection electrode TDL. The slits SL are also provided in the dummy electrode region RD as in the touch detection electrode region RT. Each slit SL is disposed for every predetermined number (here, three) of sub-pixels SPix in the horizontal direction (x direction) in FIG. 9. The pitch of the slits SL is desirably small enough to be unrecognizable by human eyes, for example, 500 μm or less. The dummy electrode region RD also has slits SLD that extend in the horizontal direction in FIG. 9 to connect the adjacent slits SL to one another. The slits SLD are provided in regions having the scan signal lines GCL on the pixel substrate 2. Specifically, the slits SLD are disposed in non-light-transmittable portions. The slits SLD are disposed for every predetermined number (here, eight) of pixels Pix (sub-pixels SPix) in the vertical direction in FIG. 9. The pitch of the slits SLD is desirably small enough to be unrecognizable by human eyes, for example, 500 μm or less, as in the slits SL. As a result, a plurality of dummy electrodes 37, defined by the slits SL and SLD, are formed in the dummy electrode region RD. The dummy electrodes 37 are not electrically connected to any other portions, namely, floating.

The slits SL, herein, are provided at positions corresponding to the sub-pixels SPix of blue (B) of the pixels Pix. This is associated with the fact that the touch detection electrode TDL and the dummy electrode 37 each have a light-transmittance lowest at blue (B) between red (R), green (G), and blue (B). Specifically, the slit SL are provided at the positions corresponding to the sub-pixels SPix of blue (B), which suppresses a reduction in intensity of blue light due to the electrodes, leading to suppression of yellowing of chromaticity of white.

The sub-pixel SPix corresponds to a specific example of "display element" of the disclosure. The liquid crystal layer 6 corresponds to a specific example of "display layer" of the disclosure. The touch detection electrode region RT corresponds to a specific example of "first region" of the disclosure. The dummy electrode region RD corresponds to a specific example of "second region" of the disclosure. The slit SL corresponds to a specific example of "first slit" of the disclosure. The slit SLD corresponds to a specific example of "second slit" of the disclosure. The scan signal line GCL corresponds to a specific example of "signal line" of the disclosure.

[Functions and Effects]

The functions and effects of the display panel with a touch detector 1 according to the embodiment are now described.

(Summary of General Operation)

The control section 11 supplies the control signal to each of the gate driver 12, the source driver 13, the drive electrode driver 14, and the touch detection section 40 based on a video signal Vdisp supplied from the outside, and thus controls those to operate in synchronization with one another. The gate driver 12 supplies the scan signals Vscan to the liquid crystal display device 20 to sequentially select one horizontal line as a display drive object. The source driver 13 supplies the pixel signals Vpix to the pixels Pix defining one horizontal line selected by the gate driver 12. The drive electrode driver 14 sequentially applies the drive signals Vcom to the drive electrodes COML. The display device with a touch detector 10 performs display operation, and performs touch detection operation based on the drive signals Vcom to output the touch detection signals Vdet from the touch detection electrodes TDL. The touch detection section 40 detects presence of a touch event in the touch detection device 30 and determines the coordinates of the touch event, and outputs the determined result as an output signal Out.

In the display panel with a touch detector 1, the electrode layout in a light-transmittable region (the effective pixel region) of each pixel Pix is the same between the touch detection electrode region RT and the dummy electrode region RD. As a result, the amount of the transmitted light in the touch detection electrode region RT is equal to that in the dummy electrode region RD, and therefore the touch detection electrodes TDL are allowed to be less visible. This is described further in detail below.

Figure 10A:
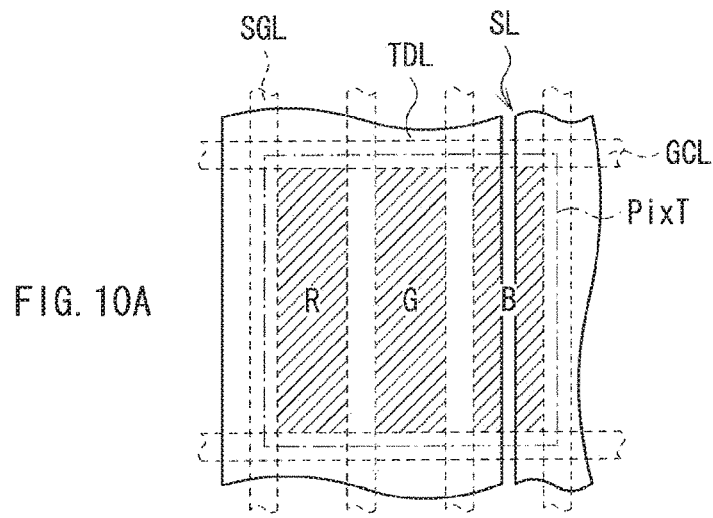
FIGS. 10A to 10C are plan views illustrating an exemplary configuration of electrode layouts in regions corresponding to pixels shown in FIG. 9.
Figure 10B:
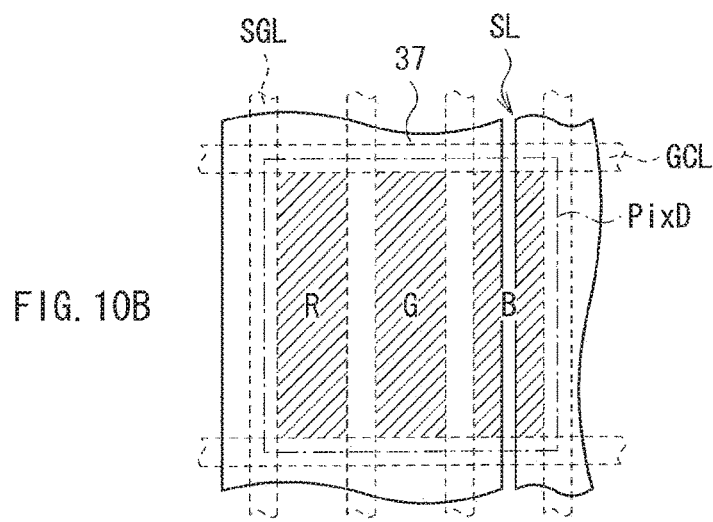
Figure 10C:
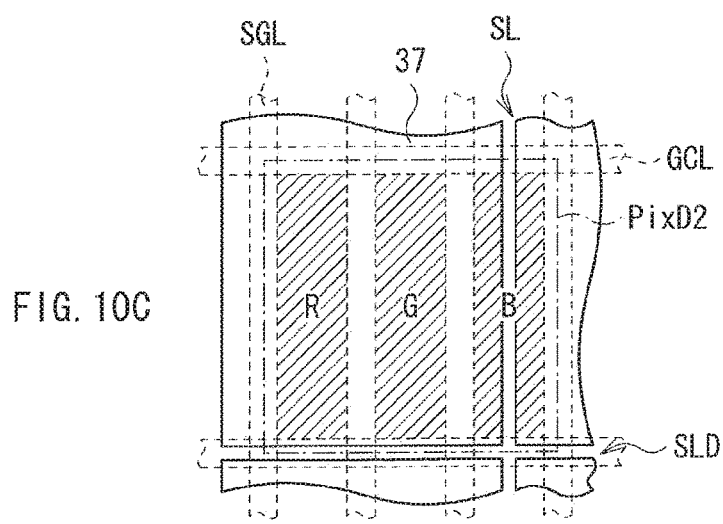

FIGS. 10A to 10C illustrate the electrode layouts in the effective pixel regions, where FIG. 10A illustrates the electrode layout in the touch detection electrode region RT, and FIGS. 10B and 10C illustrate the electrode layouts in the dummy electrode region RD. FIG. 10B illustrates the electrode layout in the effective pixel region of a pixel PixD shown in FIG. 9. FIG. 10C illustrates the electrode layout in the effective pixel region of a pixel PixD2.

As shown in FIGS. 10A and 10B, the electrode layout for a pixel PixT in the touch detection electrode region RT is the same as that for a pixel PixD in the dummy electrode region RD. As a result, the electrode layout in each effective pixel region (a region without the scan signal lines GCL and the pixel signal lines SGL) of the pixel PixT is the same as that in the effective pixel region of the pixel PixD. In detail, among the effective pixel regions of the pixel PixT, regions of the sub-pixels SPix of red (R) and green (G) are provided with an electrode (touch detection electrode TDL) covering the entire regions, and a region of the sub-pixel SPix of blue (B) is provided with an electrode (touch detection electrode TDL) covering a part of the region, the regions being hatched in FIG. 10A. Similarly, among the effective pixel regions of the pixel PixD, regions of the sub-pixels SPix of red (R) and green (G) are provided with an electrode (dummy electrode 37) covering the entire regions, and a region of the sub-pixel SPix of blue (B) is provided with an electrode (dummy electrode 37) covering a part of the region, the regions being hatched in FIG. 10B.

In contrast, the electrode layout for the pixel PixD2 in the dummy electrode region RD (FIG. 10C) is slightly different from the electrode layout for the pixel PixT (FIG. 10A) and the electrode layout for the pixel PixD (FIG. 10B), as shown in FIGS. 10A to 10C. However, the electrode layout in each effective pixel region of the pixel PixD2 is the same as that of the pixel PixT and of the pixel PixD. Specifically, among the effective pixel regions of the pixel PixD2, regions of the sub-pixels SPix of red (R) and green (G) are provided with an electrode (dummy electrode 37) covering the entire regions, and a region of the sub-pixel SPix of blue (B) is provided with an electrode (dummy electrode 37) covering a part of the region, the regions being hatched in FIG. 10C.

In this way, in the display panel with a touch detector 1, the touch detection electrode region RT and the dummy electrode region RD have the same electrode layout pattern in the effective pixel region. As a result, in the liquid crystal display device 20 of the display device with a touch detector 10, for example, even if the pixels Pix display the same color for uniform display over the entire screen, the amount of the transmitted light in the touch detection electrode region RT is equal to that in the dummy electrode region RD, and therefore the touch detection electrodes TDL are allowed to be less visible.

It is to be noted that since the touch detection electrodes TDL are provided in a layer different from a layer of the color filter 31 as shown in FIG. 5, although the slits SL are located in correspondence to the sub-pixels SPix of blue (B) as viewed from a display screen from the front, if a viewer views the display screen in an oblique direction, for example, the slits SL may be seen to be at positions corresponding to the sub-pixels SPix of green (G), thereby leading to a possibility of deviation of chromaticity. In this case, in the display panel with a touch detector 1, since the electrode layout pattern in the effective pixel region is also the same between the pixel PixT, the pixel PixD, and the pixel PixD2, the deviation of chromaticity in the touch detection electrode region RT is the same as that in the dummy electrode region RD, and therefore the touch detection electrodes TDL are allowed to be less visible.

In addition, in the display panel with a touch detector 1, the slits SLD are disposed for every eight pixels Pix (sub-pixels SPix) in the vertical direction (y direction) in FIG. 9 in the dummy electrode region RD. As a result, the electrode layout pattern in the dummy electrode region RD is similar to the electrode layout pattern in the touch detection electrode region RT without slits extending in the horizontal direction (x direction), compared with a case where the slits SLD are provided for every one pixel Pix in the dummy electrode region RD. Consequently, since the electrode layout pattern in the dummy electrode region RD is similar to that in the touch detection electrode region RT, the touch detection electrodes TDL in the touch detection electrode region RT are less visible even if externally incident light is reflected by the electrodes, for example.

Effects

As described above, in the embodiment, since an occupancy of electrodes in the effective pixel region of each pixel is the same between the touch detection electrode region and the dummy electrode region, the amount of the transmitted light is the same between the two electrode regions, and therefore the touch detection electrodes TDL are allowed to be less visible.

In addition, in the embodiment, since the electrode layout pattern in the effective pixel region in the touch detection electrode region is the same as that in the dummy electrode region, the amount of the transmitted light is the same between the sub-pixels having the same color in the respective two electrode regions, and therefore the touch detection electrodes TDL are allowed to be less visible.

In addition, in the embodiment, since the slits SLD are provided for every several pixels, the electrode layout pattern in the touch detection electrode region is similar to that in the dummy electrode region, and therefore the touch detection electrodes TDL are allowed to be less visible even if externally incident light is reflected by the electrodes.

[Modification 1-1]

Figure 11:
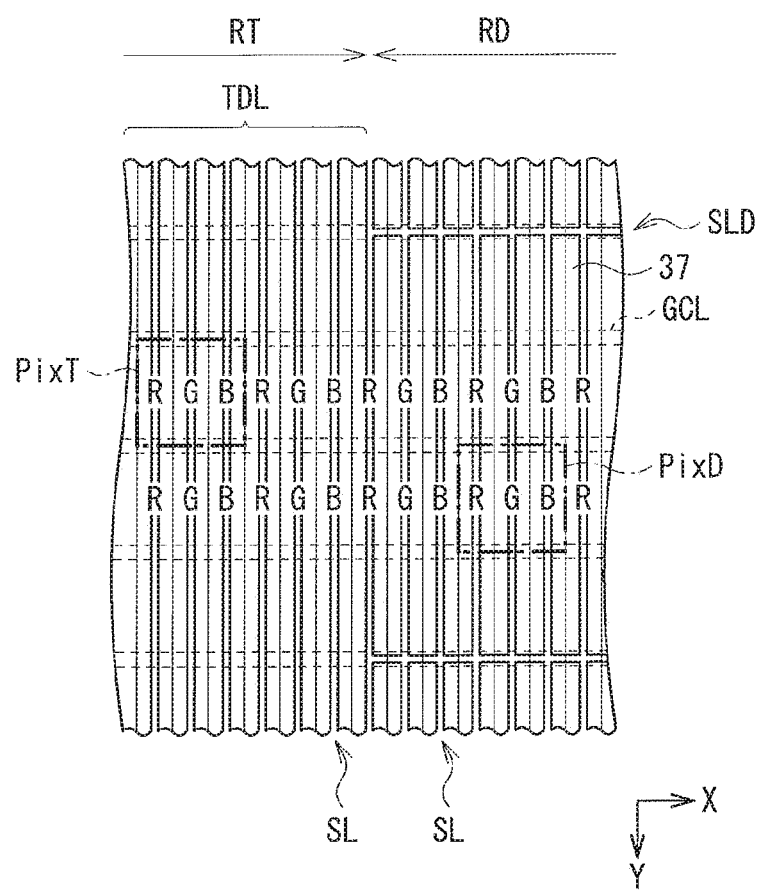
FIG. 11 is a plan view illustrating an exemplary configuration of electrode layouts in the touch detection electrode region and the dummy electrode region according to a modification of the first embodiment.

While the slits SL are disposed for every three sub-pixels SPix, and the slits SLD are disposed for every eight pixels Pix (sub-pixels SPix) in the first embodiment, this is not limitative. The slits SL may be disposed for every two or less or every four or more sub-pixels SPix. Alternatively, the slits SLD may be disposed for every seven or less or every nine or more pixels Pix (sub-pixels SPix). FIG. 11 illustrates an electrode layout where the slits SL are disposed for every one sub-pixel SPix, and the slits SLD are disposed for every four pixels Pix (sub-pixels SPix). This also allows the touch detection electrodes TDL to be less visible, as in the first embodiment.

[Modification 1-2]

Figure 12:
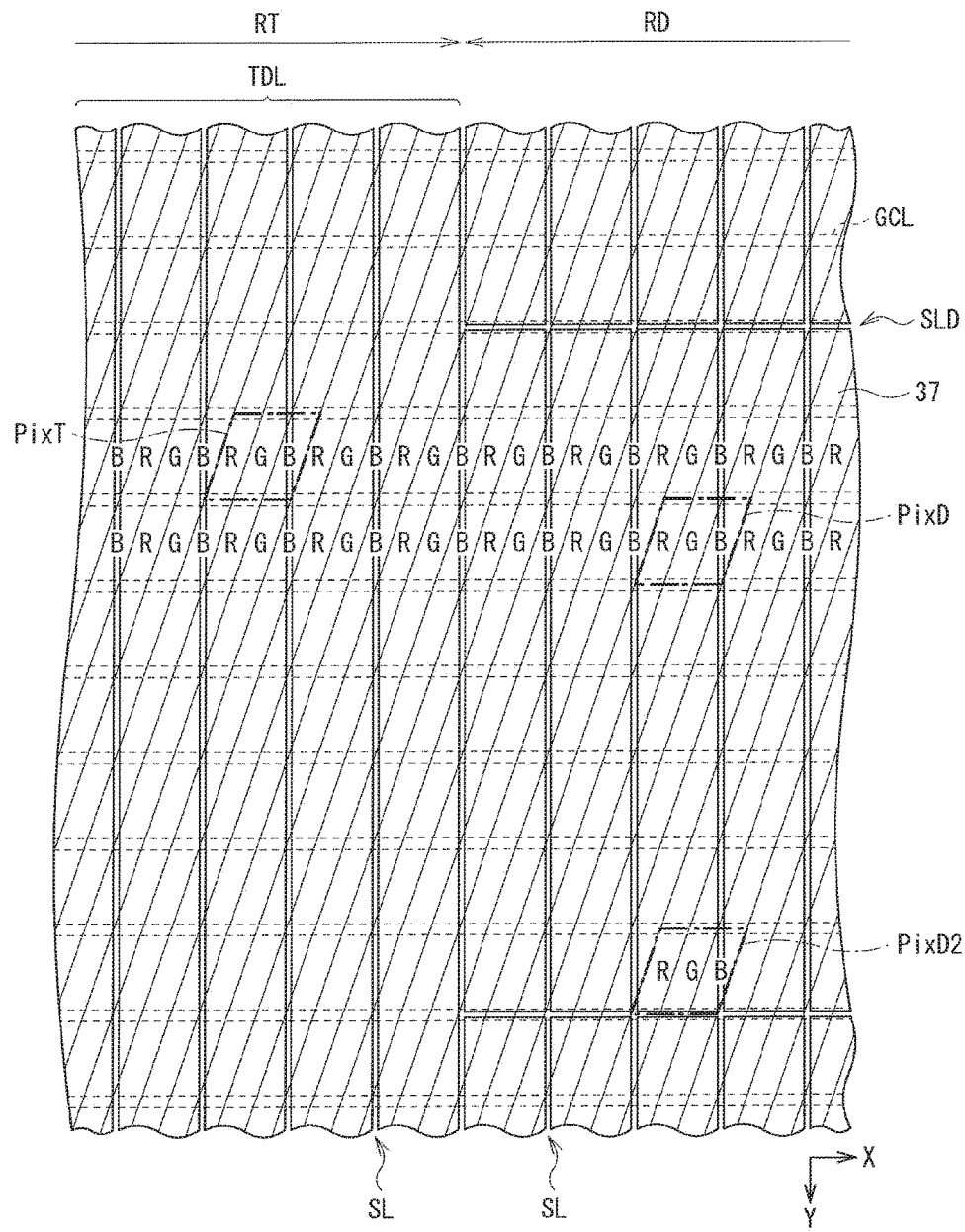
FIG. 12 is a plan view illustrating an exemplary configuration of electrode layouts in the touch detection electrode region and the dummy electrode region according to another modification of the first embodiment.
Figure 13A:
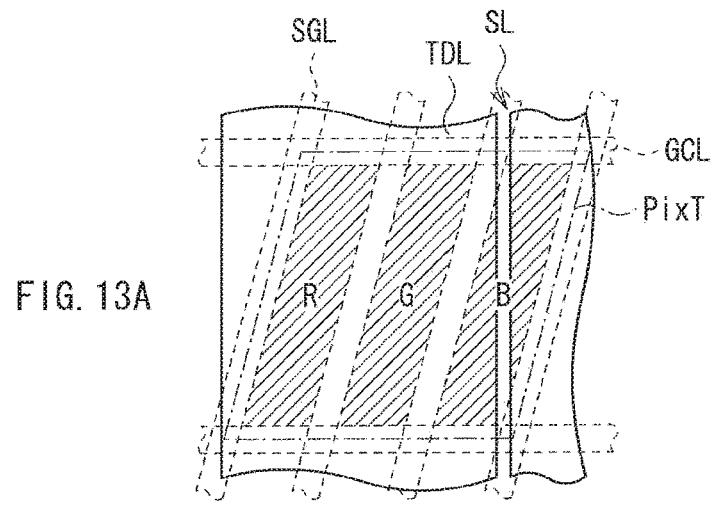
FIGS. 13A to 13C are plan views illustrating an exemplary configuration of electrode layouts in regions corresponding to pixels shown in FIG. 12.
Figure 13B:
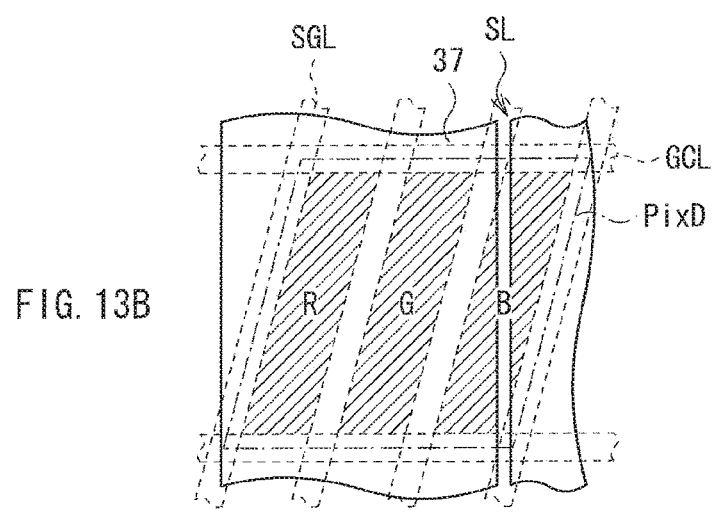
Figure 13C:
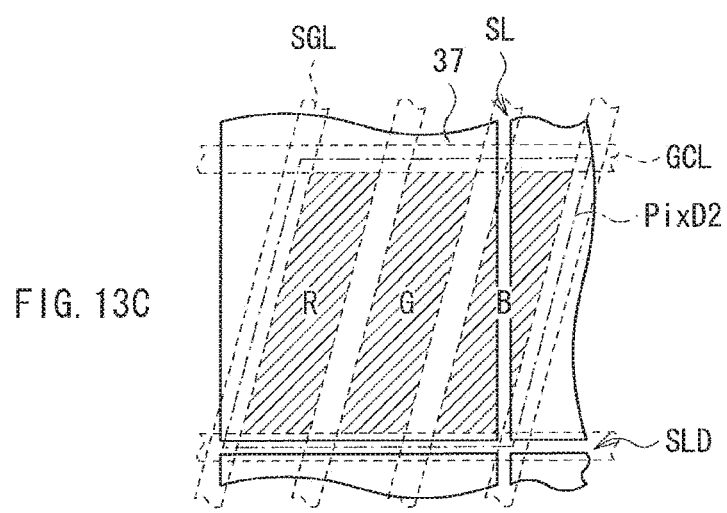

While each sub-pixel SPix has a rectangular shape in the first embodiment, this is not limitative. Instead, the sub-pixel SPix may have a shape of a parallelogram, for example, as shown in FIG. 12. In this case, the electrode layout in the effective pixel region of the pixel PixT, hatched in FIG. 13A, is also the same as the electrode layout in each of the effective pixel regions of the pixel PixD and the pixel PixD2, hatched in FIGS. 13B and 13C, as shown in FIGS. 13A to 13C. As a result, the touch detection electrodes TDL are less visible as in the first embodiment.

3. Second Embodiment

A display panel with a touch detector 120 according to a second embodiment is now described. In the second embodiment, the touch detection electrode region RT also has slits extending in a direction crossing the slits SL. It is to be noted that substantially the same components as those of the display panel with a touch detector 1 according to the first embodiment are designated by the same numerals, and description of them is appropriately omitted.

FIG. 14 illustrates an exemplary configuration of electrode layouts in the touch detection electrode region RT and the dummy electrode region RD of the display panel with a touch detector 120. It is to be noted that the scan signal lines GCL are illustrated by a thick line in FIG. 14 for convenience of the description.

The touch detection electrode region RT has slits SLT extending in the horizontal direction (x direction) in FIG. 14. The slits SLT are provided at positions corresponding to the scan signal lines GCL as in the slits SLD provided in the dummy electrode region RD. The slits SLT and the slits SLD are, herein, disposed for every one pixel Pix (sub-pixel SPix) in the vertical direction (y direction) in FIG. 14. The slits SLT extend right and left from a slit SL as the center. The length of the slit SLT is equal to the width of the pixel Pix in the horizontal direction in FIG. 14. The width of the slit SLT is the same as the width of the slit SLD. The slits SLT on the adjacent slits SL are arranged in a staggered configuration in the vertical direction in FIG. 14.

The slit SLT corresponds to a specific example of "third slit" of the disclosure.

According to such a configuration, in the display panel with a touch detector 120, as in the display panel with a touch detector 1 of the first embodiment, since the electrode layout in the effective pixel region of each pixel is the same between the touch detection electrode region RT and the dummy electrode region RD, the amount of the transmitted light is the same between the two electrode regions, and therefore the touch detection electrodes TDL2 are allowed to be less visible.

In addition, in the display panel with a touch detector 120, the slits SLT are provided in the touch detection electrode region RT, so that the touch detection electrode region RT and the dummy electrode region RD have the same occupancy of electrodes per unit area, and besides have the electrode layout patterns similar to each other. Specifically, in the display panel with a touch detector 120, the dummy electrode region RD has the slits SLD for every pixel Pix (sub-pixel SPix) arranged side by side in the vertical direction (y direction) in FIG. 14. In this case, the touch detection electrode region RT also has the slits SLT for every one pixel Pix (sub-pixel SPix) arranged side by side in the vertical direction in FIG. 14, so that the touch detection electrode region RT and the dummy electrode region RD have the electrode layout patterns similar to each other compared with the case where the touch detection electrode region RT does not have the slits SLT as in the first embodiment. As a result, in the display panel with a touch detector 120, the touch detection electrodes TDL2 are less visible even if externally incident light is reflected by the electrodes, for example.

In other words, the display panel with a touch detector 1 according to the first embodiment is configured such that the number of the slits SLD is small in the dummy electrode region RD so that the touch detection electrode region RT and the dummy electrode region RD have the electrode layout patterns similar to each other even if the slits SLT are not provided in the touch detection electrode region RT.

In contrast, the display panel with a touch detector 120 according to the second embodiment is configured such that the slits SLT are also provided in the touch detection electrode region RT in the same way as the slits SLD in the dummy electrode region RD, so that the touch detection electrode region RT and the dummy electrode region RD have the same occupancy of electrodes per unit area, and have electrode layout patterns similar to each other. As a result, for example, even if a large number of slits SLD are arranged in the dummy electrode region RD, a similar number of slits SLT are provided in the touch detection electrode region RT, thereby allowing the touch detection electrodes TDL2 to be less visible.

As described above, in the second embodiment, since the touch detection electrode region has the slits SLT, for example, even if a large number of slits SLD are arranged in the dummy electrode region, the touch detection electrode region RT and the dummy electrode region RD have the same occupancy of electrodes per unit area, and have electrode layout patterns similar to each other, and therefore the touch detection electrodes are allowed to be less visible. Other effects are similar to those in the first embodiment.

[Modification 2-1]

Figure 15:
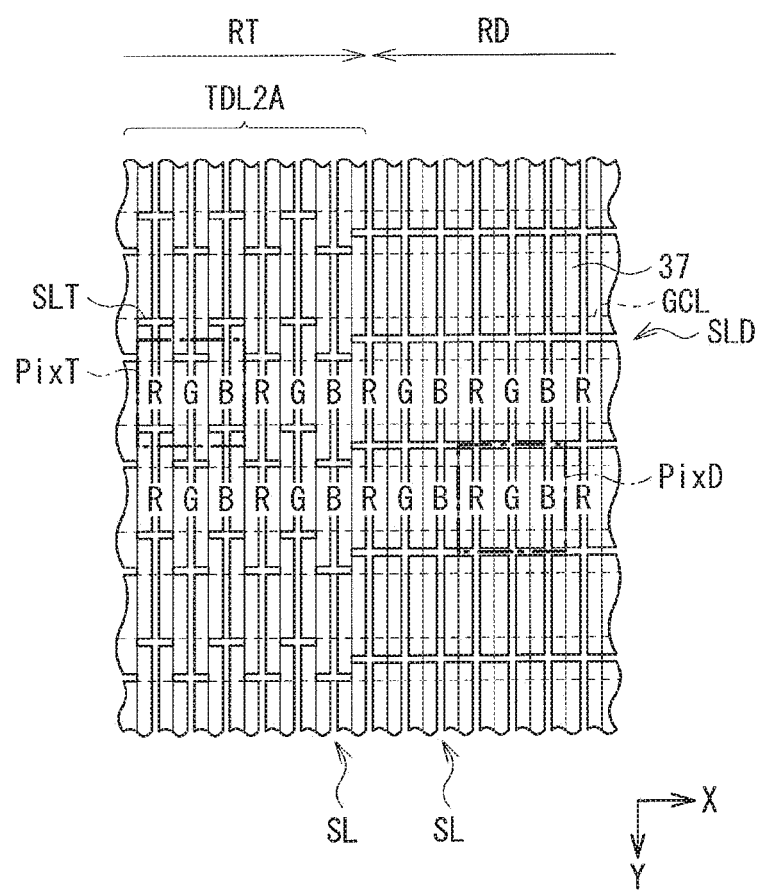
FIG. 15 is a plan view illustrating an exemplary configuration of electrode layouts in the touch detection electrode region and the dummy electrode region according to a modification of the second embodiment.

While the slits SL are disposed for every three sub-pixels SPix in the second embodiment, this is not limitative. Instead, the slits SL may be disposed for every two or less or every four or more sub-pixels SPix, for example. FIG. 15 illustrates an example where the slits SL are disposed for every one sub-pixel SPix. In this case, the touch detection electrodes TDL2A are also less visible as in the second embodiment.

[Modification 2-2]

Figure 16:
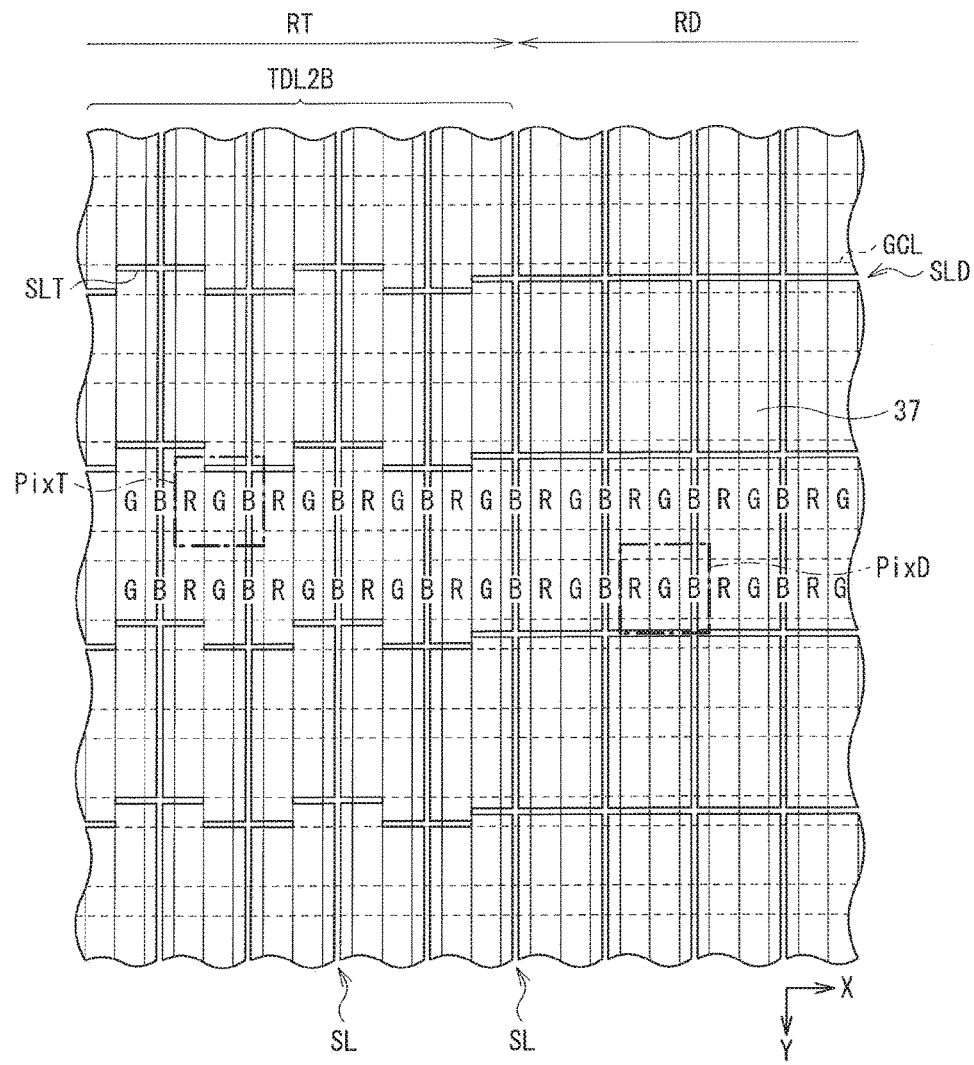
FIG. 16 is a plan view illustrating an exemplary configuration of electrode layouts in the touch detection electrode region and the dummy electrode region according to another modification of the second embodiment.

While the slits SLD and the slits SLT are each disposed for every one pixel Pix (sub-pixel SPix) in the second embodiment, this is not limitative. Instead, the slits SLD and SLT may be each disposed for every two or more pixels Pix (sub-pixels SPix), for example. FIG. 16 illustrates an example where the slits SLD and the slits SLT are each disposed for every two pixels Pix (sub-pixels SPix). In this case, the touch detection electrodes TDL2B are also less visible as in the second embodiment.

[Other Modification]

While each sub-pixel SPix has a rectangular shape in the second embodiment, this is not limitative. Instead, the sub-pixel SPix may have a shape of a parallelogram, as in the modification 1-2 of the first embodiment.

4. THIRD EMBODIMENT

A display panel with a touch detector 130 according to a third embodiment is now described. The third embodiment corresponds to the display panel with a touch detector 120 according to the second embodiment, modified such that the slits SLD in the dummy electrode region RD are arranged in a staggered configuration in the same way as the slits SLT in the touch detection electrode region RT. It is to be noted that substantially the same components as those of the display panel with a touch detector 120 according to the second embodiment are designated by the same numerals, and description of them is appropriately omitted.

Figure 17:
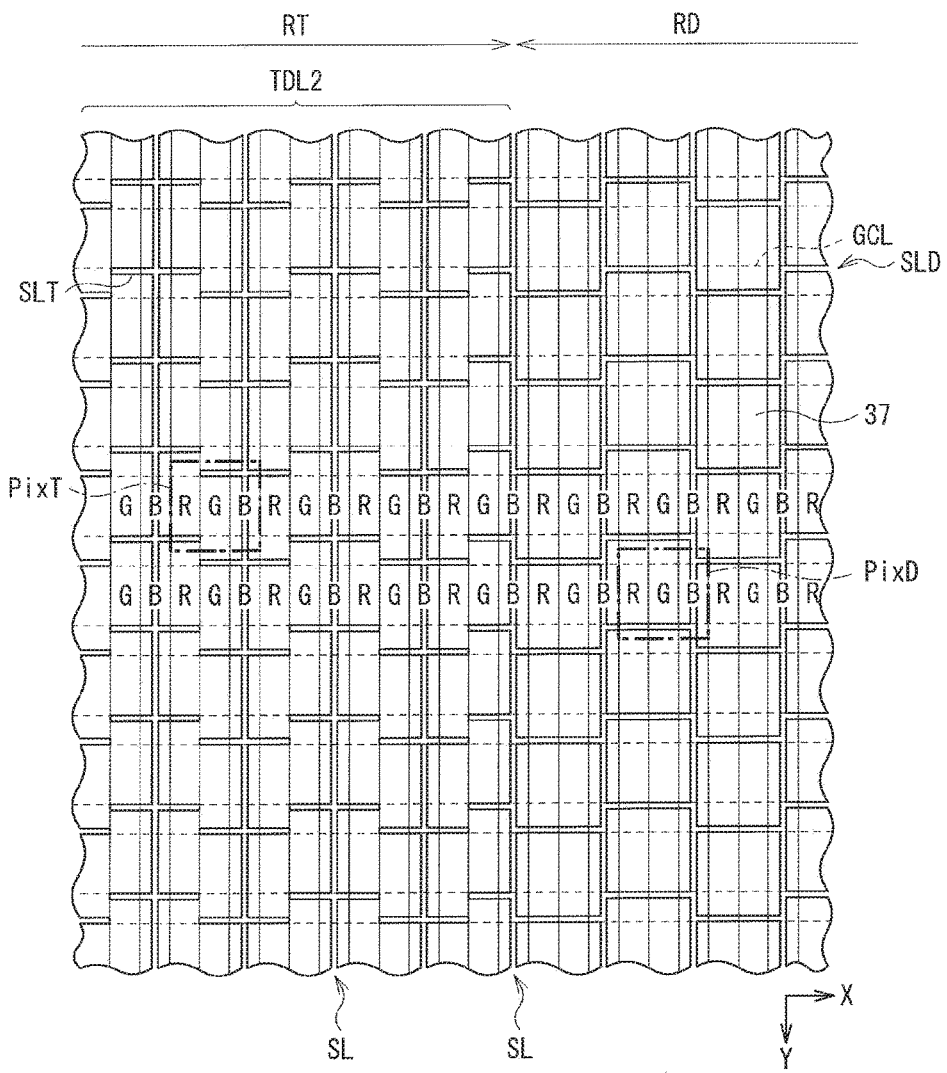
FIG. 17 is a plan view illustrating an exemplary configuration of electrode layouts in a touch detection electrode region and a dummy electrode region according to a third embodiment.

FIG. 17 illustrates an exemplary configuration of electrode layouts in the touch detection electrode region RT and the dummy electrode region RD of the display panel with a touch detector 130. It is to be noted that the scan signal lines GCL are illustrated by a thick line for convenience of the description in FIG. 17.

In the display panel with a touch detector 130, the slits SLD adjacent to one another in the horizontal direction (x direction) in FIG. 17 are arranged in the dummy electrode region RD in a staggered configuration in the same way as the slits SLT in the touch detection electrode region RT. As a result, in the display panel with a touch detector 130, the touch detection electrode region RT and the dummy electrode region RD have the electrode layout patterns further similar to each other compared with the display panel with a touch detector 120 according to the second embodiment, and therefore the touch detection electrodes TDL2 are allowed to be further less visible even if externally incident light is reflected by the electrodes, for example.

As described above, in the third embodiment, since the slits SLD in the dummy electrode region RD are arranged in a staggered configuration in the same way as the slits SLT in the touch detection electrode region RT, the touch detection electrodes are allowed to be further less visible. Other effects are similar to those in the second embodiment.

[Modification 3-1]

Figure 18A:
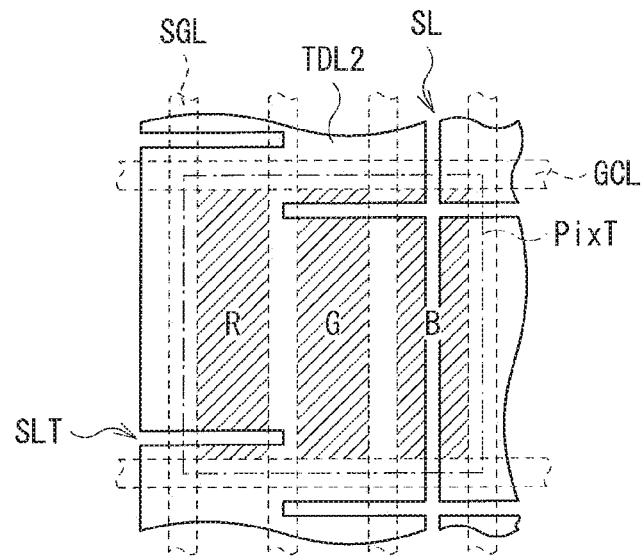
FIGS. 18A and 18B are plan views illustrating an exemplary configuration of electrode layouts in regions corresponding to pixels shown in FIG. 17.
Figure 18B:
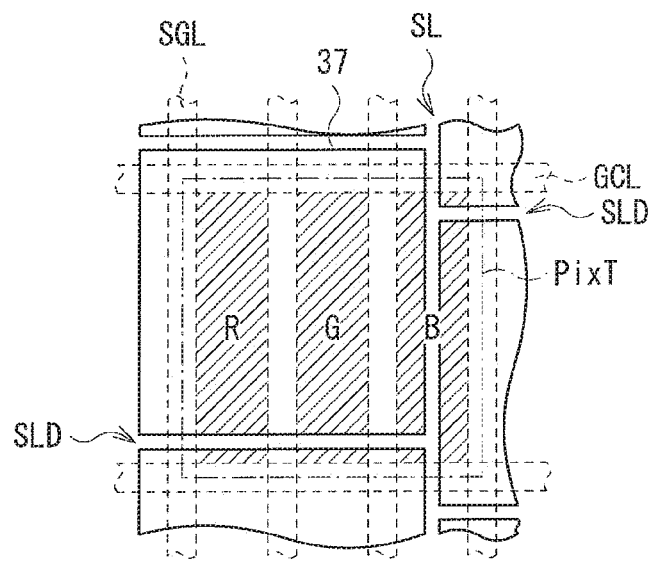

In the third embodiment, while both the slits SLT and the slits SLD are arranged in a staggered configuration in the regions having the scan signal lines GCL, this is not limitative. Instead, the slits SLT and SLD may be arranged in a staggered configuration across the respective regions having the scan signal lines GCL. In such a case, for example, as shown in FIGS. 18A and 18B, although an electrode layout pattern in the effective pixel region of a pixel PixT, hatched in FIG. 18A, is slightly different from an electrode layout pattern in the effective pixel region of a pixel PixD, hatched in FIG. 18B, the occupancy of electrodes is the same between the two effective pixel regions, and therefore the touch detection electrodes TDL2 are allowed to be less visible as in the third embodiment.

[Modification 3-2]

Figure 19:
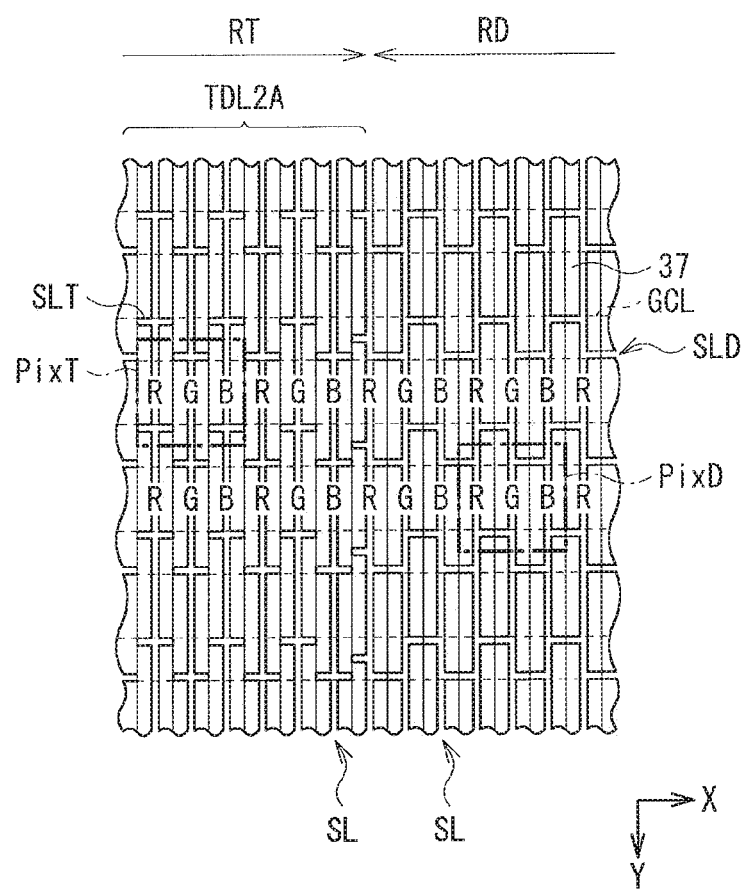
FIG. 19 is a plan view illustrating an exemplary configuration of electrode layouts in a touch detection electrode region and a dummy electrode region according to a modification of the third embodiment.

While the slits SL are disposed for every three sub-pixels SPix in the third embodiment, this is not limitative. Instead, the slits SL may be disposed for every two or less or every four or more sub-pixels SPix, for example. FIG. 19 illustrates an example where the slits SL are disposed for every one sub-pixel SPix. In this case, the touch detection electrodes TDL2A are also less visible as in the third embodiment.

[Other Modification]

While each sub-pixel SPix has a rectangular shape in the third embodiment, this is not limitative. Instead, the sub-pixel SPix may have a shape of a parallelogram as in the modification 1-2 of the first embodiment.

5. Fourth Embodiment

A display panel with a touch detector 140 according to a fourth embodiment is now described. The fourth embodiment corresponds to the display panel with a touch detector 120 according to the second embodiment, modified such that the slits SLT in the touch detection electrode region RT and the slits SLD in the dummy electrode region RD are arranged to extend obliquely. It is to be noted that substantially the same components as those of the display panel with a touch detector 120 according to the second embodiment are designated by the same numerals, and description of them is appropriately omitted.

Figure 20:
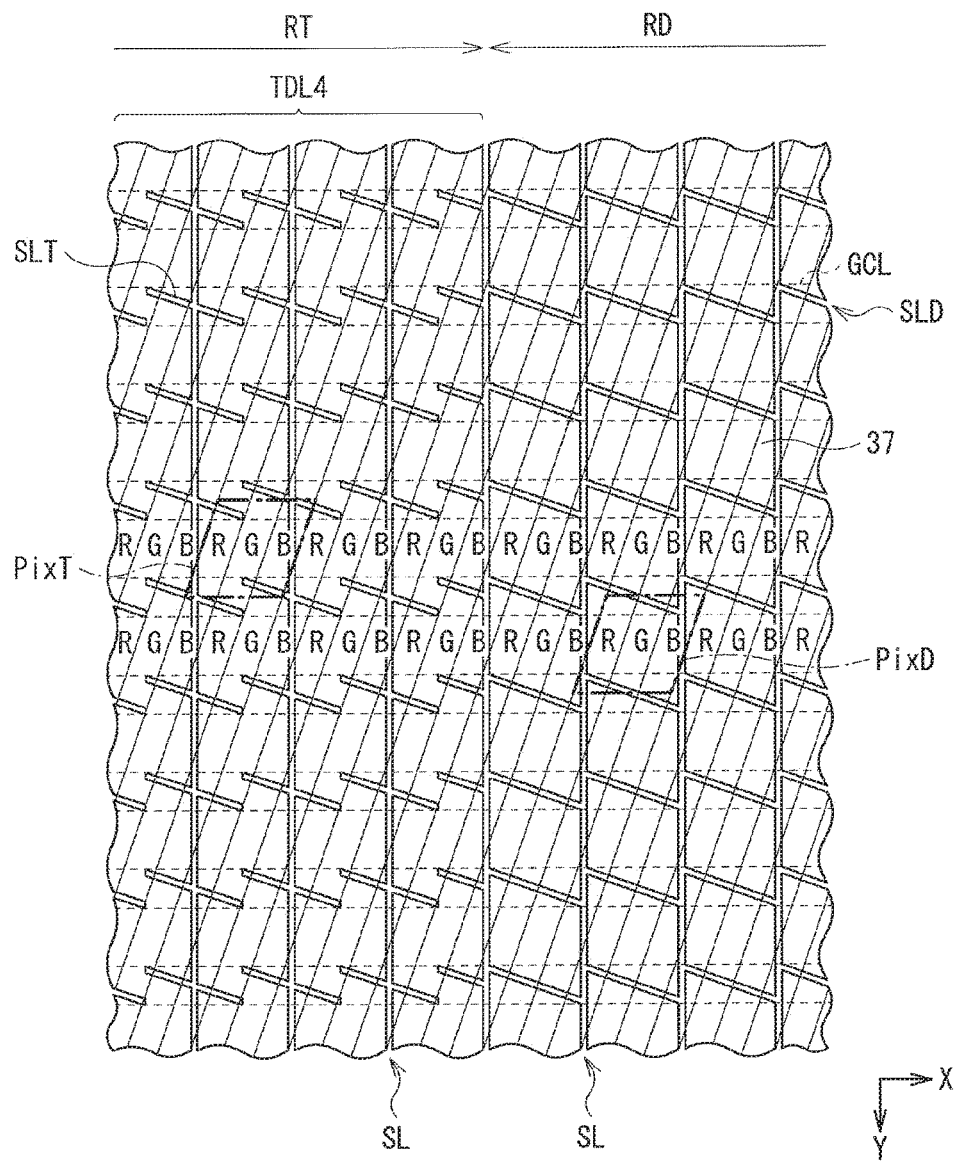
FIG. 20 is a plan view illustrating an exemplary configuration of electrode layouts in a touch detection electrode region and a dummy electrode region according to a fourth embodiment.

FIG. 20 illustrates an exemplary configuration of electrode layouts in the touch detection electrode region RT and the dummy electrode region RD of the display panel with a touch detector 140. In the display panel with a touch detector 140, each sub-pixel SPix has a shape of a parallelogram, and the slits SLT in the touch detection electrode region RT and the slits SLD in the dummy electrode region RD accordingly obliquely extend in the respective regions having the scan signal lines GCL. In the touch detection electrode region RT, the slits SLT on the adjacent slits SL are arranged in the same positions in the vertical direction in FIG. 20, unlike in the third embodiment (FIG. 17).

As a result, in the display panel with a touch detector 140, the touch detection electrode region RT and the dummy electrode region RD have electrode layout patterns similar to each other, and therefore the touch detection electrodes TDL4 are allowed to be less visible even if externally incident light is reflected by the electrodes, for example.

As described above, in the fourth embodiment, the slits SLT and the slits SLD extend obliquely, and therefore the touch detection electrodes are allowed to be less visible without forming the slits in the staggered configuration as in the second embodiment. Other effects are similar to those in the second embodiment.

Modification 4-1

Figure 21A:
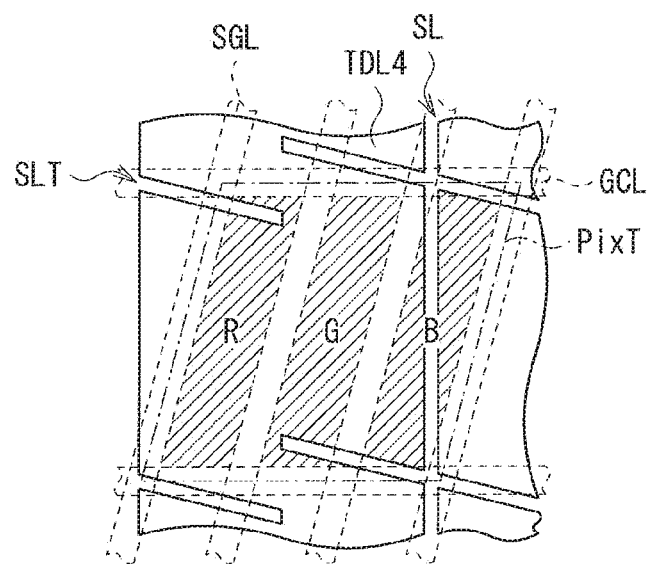
FIGS. 21A and 21B are plan views illustrating an exemplary configuration of electrode layouts in regions corresponding to pixels shown in FIG. 20.
Figure 21B:
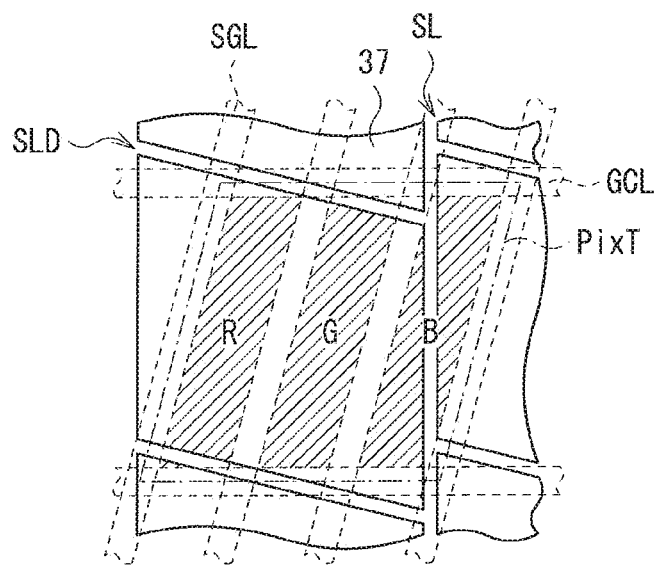

While both the slits SLT and the slits SLD are provided in the regions having the scan signal lines GCL, this is not limitative. Instead, the slits SLT and SLD may protrude from the respective regions having the scan signal lines GCL. In such a case, as shown in FIGS. 21A and 21B, although an electrode layout pattern in the effective pixel region of the pixel PixT, hatched in FIG. 21A, is slightly different from an electrode layout pattern in the effective pixel region of the pixel PixD, hatched in FIG. 21B, the occupancy of electrodes is substantially the same between the two effective pixel regions, thereby allowing the touch detection electrodes TDL4 to be less visible as in the fourth embodiment.

[Other Modification]

While the slits SL are disposed for every three sub-pixels SPix in the fourth embodiment, this is not limitative. Instead, the slits SL may be disposed for every two or less or every four or more sub-pixels SPix, for example.

While the slits SLD and the slits SLT are each disposed for every one pixel Pix (sub-pixel SPix) in the fourth embodiment, this is not limitative. Instead, the slits SLD and SLT may be each disposed for every two or more pixels Pix (sub-pixels SPix), for example.

While each sub-pixel SPix has a shape of a parallelogram in the fourth embodiment, this is not limitative. Instead, the sub-pixel SPix may have a rectangular shape as in the third embodiment and others.

6. Fifth Embodiment

A display panel with a touch detector 150 according to a fifth embodiment is now described. The fifth embodiment corresponds to the display panel with a touch detector 120 according to the second embodiment, modified such that the slits SLT in the touch detection electrode region RT are formed thick instead of disposing the slits SLT in a staggered configuration. It is to be noted that substantially the same components as those of the display panel with a touch detector 120 according to the second embodiment are designated by the same numerals, and description of them is appropriately omitted.

Figure 22:
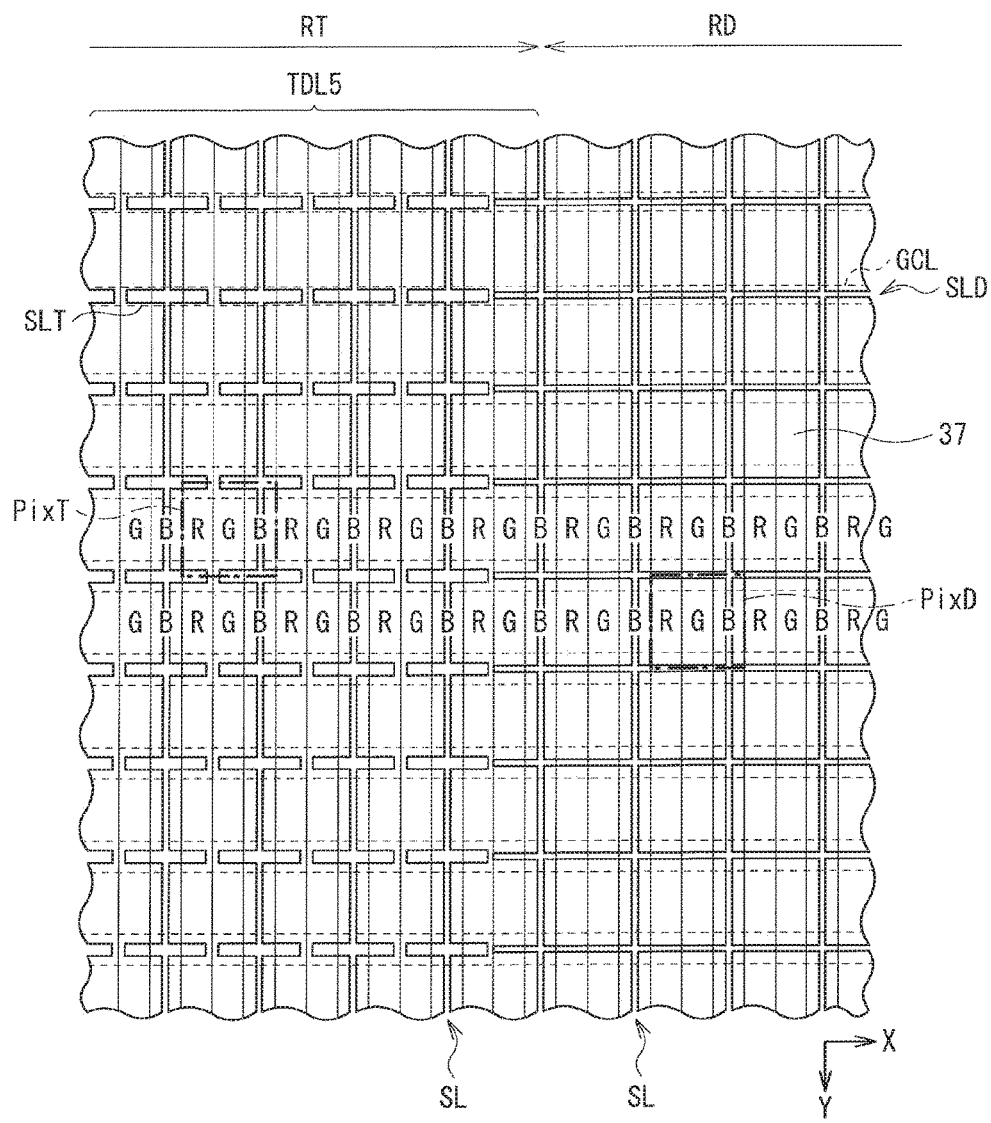
FIG. 22 is a plan view illustrating an exemplary configuration of electrode layouts in a touch detection electrode region and a dummy electrode region according to a fifth embodiment.

FIG. 22 illustrates an exemplary configuration of electrode layouts in the touch detection electrode region RT and the dummy electrode region RD of the display panel with a touch detector 150. Each slit SLT in the touch detection electrode region RT has a length shorter than the width of a pixel Pix in a horizontal direction (x direction) in FIG. 22, and has a width larger than that of each slit SLD in the dummy electrode region RD. As a result, the touch detection electrode region RT and the dummy electrode region RD have the same occupancy of electrodes per unit area. The slits SLT on the adjacent slits SL are arranged in the same positions in the vertical direction (y direction) in FIG. 22.

As a result, in the display panel with a touch detector 150, the touch detection electrode region RT and the dummy electrode region RD have electrode layout patterns similar to each other, and therefore the touch detection electrodes TDL5 are allowed to be less visible even if externally incident light is reflected by the electrodes, for example.

As described above, in the fifth embodiment, the slits SLT are formed thick, thereby allowing the touch detection electrodes to be less visible without forming the slits in a staggered configuration as in the second embodiment. Other effects are similar to those in the second embodiment.

[Modification 5-1]

Figure 23:
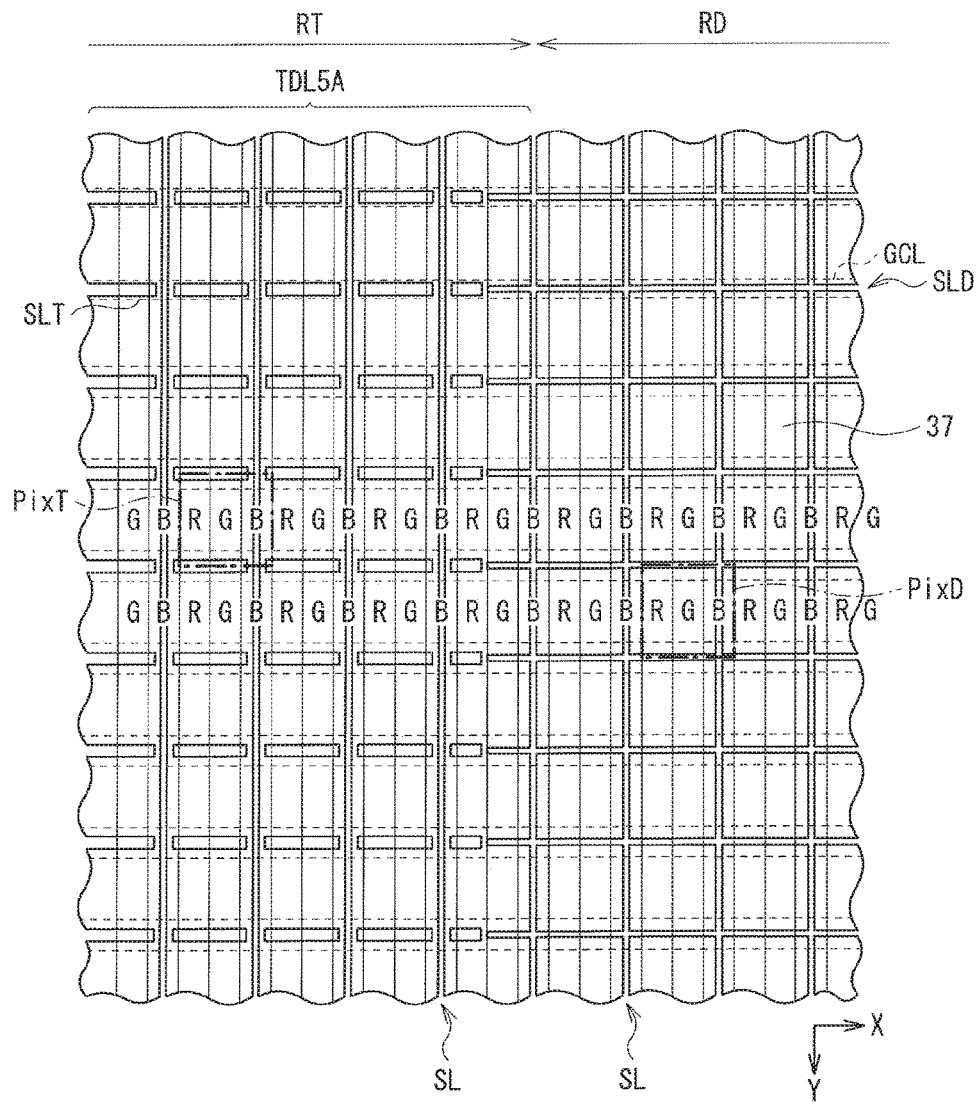
FIG. 23 is a plan view illustrating an exemplary configuration of electrode layouts in the touch detection electrode region and the dummy electrode region according to a modification of the fifth embodiment.

While each slit SLT extends right and left from the slit SL in the fifth embodiment, this is not limitative. For example, the slits SLT may be separated from the slits SL as shown in FIG. 23. In this case, the touch detection electrode region RT and the dummy electrode region RD also have electrode layout patterns similar to each other, and therefore the touch detection electrodes TDL5A are allowed to be less visible as in the fifth embodiment.

7. Application Examples

Application examples of each display panel with a touch detector in the above-described embodiments and modifications are now described with reference to FIGS. 24 to 28G. The display panel with a touch detector described in the embodiments and others is applicable to electronic units in various fields, including a television apparatus, a digital camera, a notebook personal computer, a mobile terminal device such as a mobile phone, and a video camera. In other words, the display panel with a touch detector in the embodiments and others is applicable to electronic units in various fields for displaying externally-input or internally-generated video signals as still or video images.

Application Example 1

Figure 24:
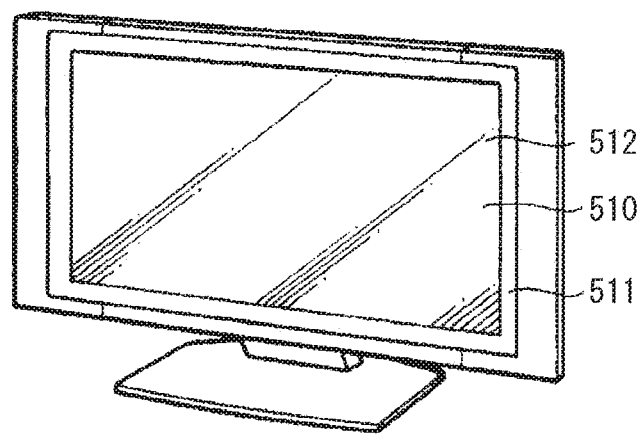
FIG. 24 is a perspective diagram illustrating an appearance configuration of an application example 1, among display panels with a touch detector applied with the embodiments.

FIG. 24 shows appearance of a television apparatus applied with the display panel with a touch detector according to the embodiments and others. The television apparatus has, for example, an image display screen section 510 including a front panel 511 and filter glass 512. The image display screen section 510 is configured of the display panel with a touch detector according to the embodiments and others.

Application Example 2

Figure 25A:
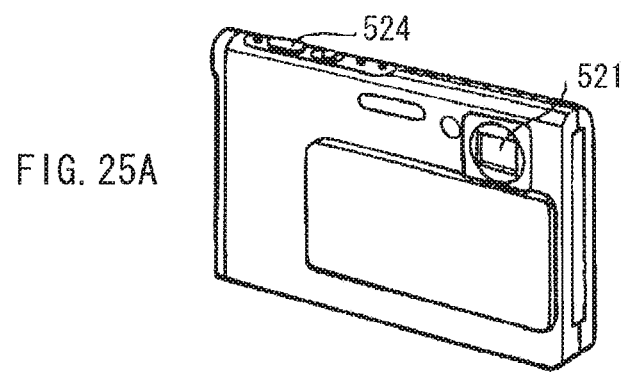
FIGS. 25A and 25B are perspective diagrams illustrating an appearance configuration of an application example 2.
Figure 25B:
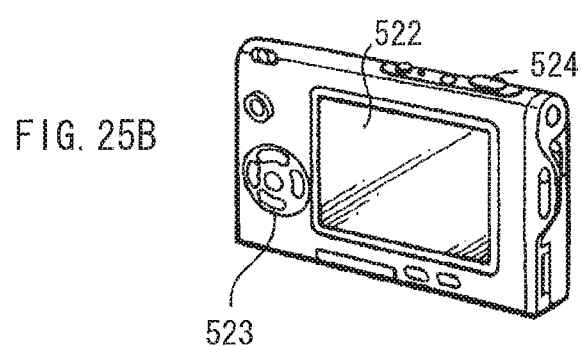

FIGS. 25A and 25B show appearance of a digital camera applied with the display panel with a touch detector according to the embodiments and others. The digital camera has, for example, a light emitting section for flash 521, a display section 522, a menu switch 523, and a shutter button 524. The display section 522 is configured of the display panel with a touch detector according to the embodiments and others.

Application Example 3

Figure 26:
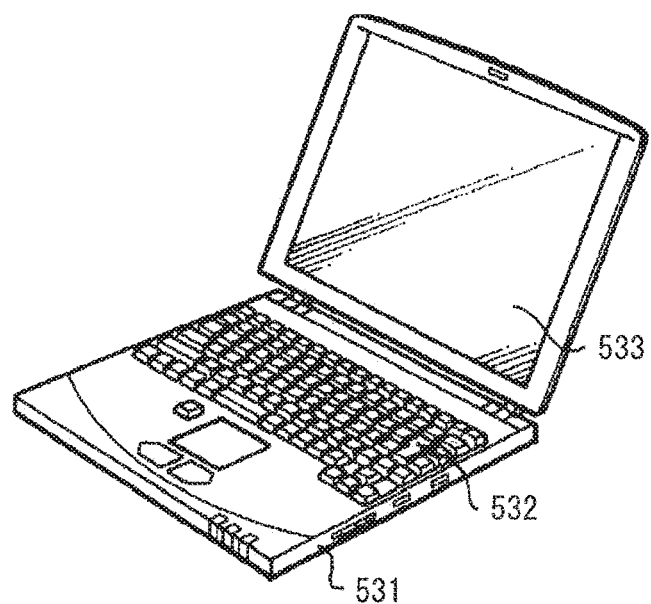
FIG. 26 is a perspective diagram illustrating an appearance configuration of an application example 3.

FIG. 26 shows appearance of a notebook personal computer applied with the display panel with a touch detector according to the embodiments and others. The notebook personal computer has, for example, a main body 531, a keyboard 532 for input operation of letters and the like, and a display section 533 for displaying images. The display section 533 is configured of the display panel with a touch detector according to the embodiments and others.

Application Example 4

Figure 27:
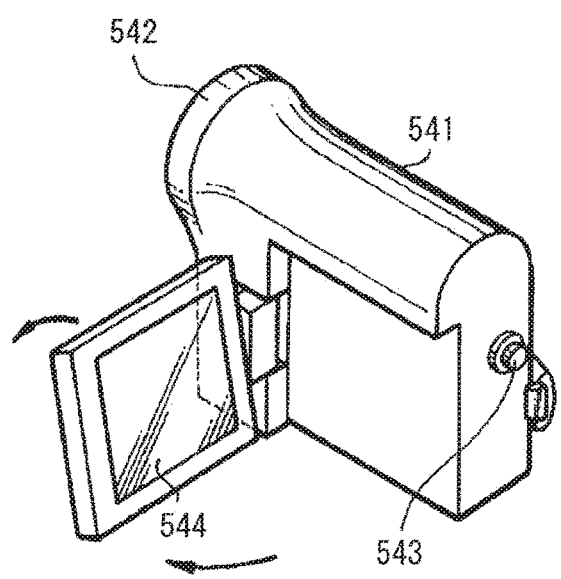
FIG. 27 is a perspective diagram illustrating an appearance configuration of an application example 4.
Figure 28:
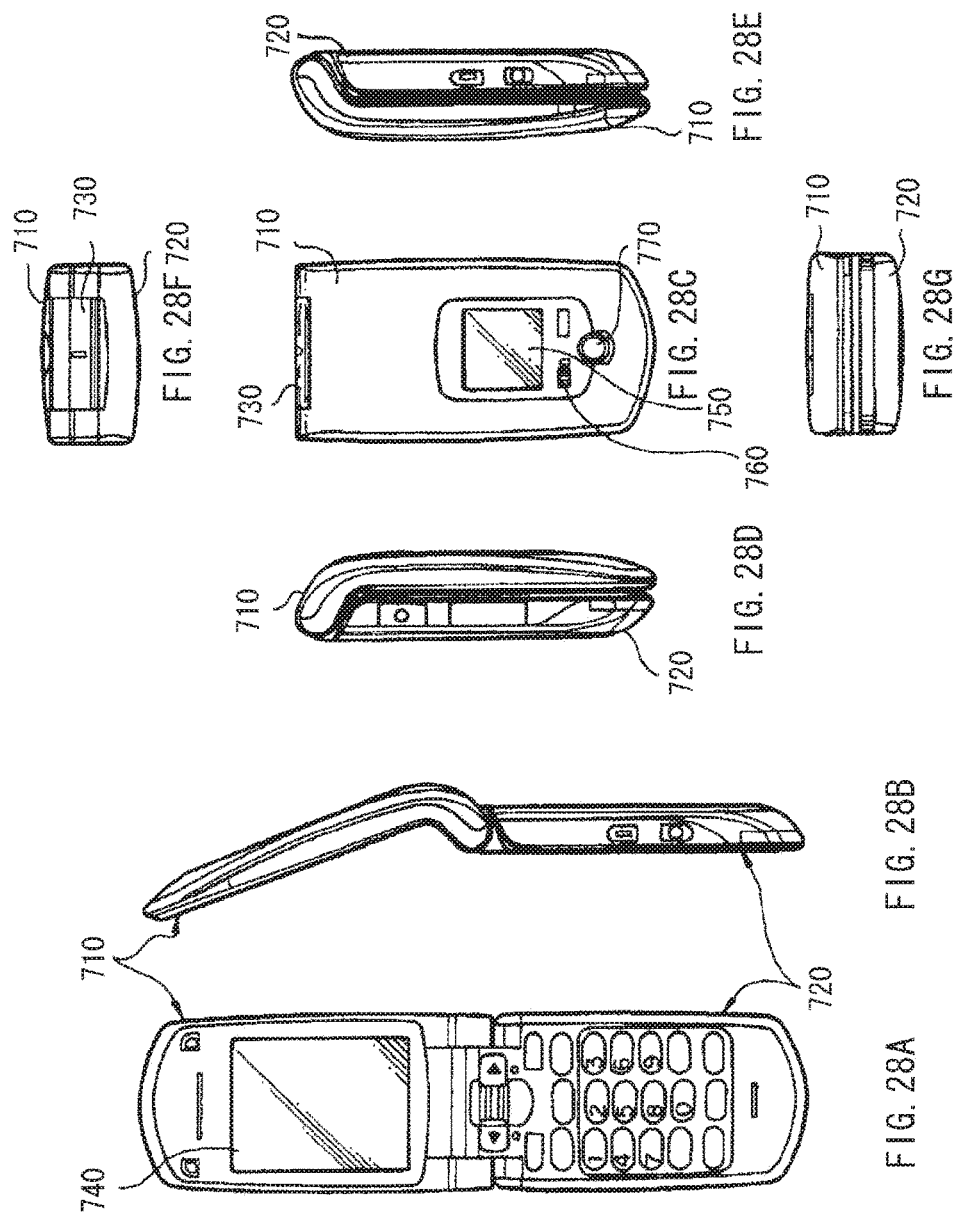
FIGS. 28A to 28G are front diagrams, side diagrams, a top diagram, and a bottom diagram illustrating an appearance configuration of an application example 5.

FIG. 27 shows appearance of a video camera applied with the display panel with a touch detector according to the embodiments and others. The video camera has, for example, a main body section 541, an object-shooting lens 542 provided on a front side face of the main body section 541, a start/stop switch 543 for shooting, and a display section 544. The display section 544 is configured of the display panel with a touch detector according to the embodiments and others.

Application Example 5

FIGS. 28A to 28G show appearance of a mobile phone applied with the display panel with a touch detector according to the embodiments and others. For example, the mobile phone is configured of an upper housing 710 and a lower housing 720 connected to each other by a hinge section 730, and has a display 740, a sub display 750, a picture light 760, and a camera 770. The display 740 or the sub display 750 is configured of the display panel with a touch detector according to the embodiments and others.

While the present technology has been described with the several embodiments, the modifications, and the application examples to electronic units hereinbefore, the technology is not limited to the embodiments and others, and various modifications or alterations may be made.

For example, while the drive electrodes COML are provided on the TFT substrate 21 and the pixel electrodes 22 are provided on the drive electrodes COML with the insulating film 23 therebetween in the embodiments and others, this is not limitative. Instead, for example, the pixel electrodes 22 may be provided on the TFT substrate 21, and the drive electrodes COML may be provided on the pixel electrodes 22 with the insulating film 23 therebetween.

Figure 29:
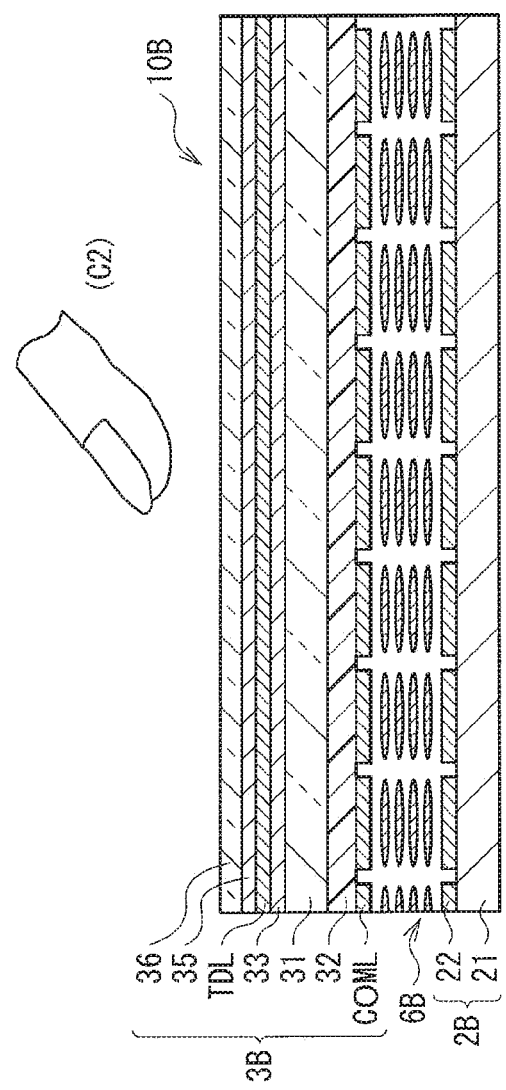
FIG. 29 is a sectional diagram illustrating a schematic sectional structure of a display device with a touch detector according to a modification.

For example, although the liquid crystal display device including a transverse electric mode of liquid crystal, such as a FFS mode and an IPS mode, is integrated with the touch detection device in the embodiments and others, a liquid crystal display device including various other modes of liquid crystal, such as a twisted nematic (TN) mode, a vertical alignment (VA) mode, and an electrically controlled birefringence (ECB) mode, may be integrated with the touch detection device, instead. In the case where such types of liquid crystal are used, the display device with a touch detector is configured as shown in FIG. 29. FIG. 29 illustrates an exemplary sectional structure of a major part of a display device with a touch detector 10B according to a modification, and illustrates a configuration where a liquid crystal layer 6B is sandwiched between a pixel substrate 2B and a counter substrate 3B. Since names, functions, and the like of other sections are similar to those in FIG. 5, description of them is omitted. This exemplary device is different from the device of FIG. 5 in that the drive electrodes COML used for both display and touch detection are provided on the counter substrate 3B.

In addition, for example, although a so-called in-cell type, where a liquid crystal display device is integrated with a capacitance-type touch detection device, is used in the above-described embodiments and others, this is not limitative. Instead, for example, a so-called on-cell type, where the capacitance-type touch detection device is provided on the liquid crystal display device, may be used. Alternatively, the capacitance-type touch detection device may be separated from the display section.

In addition, for example, although the liquid crystal elements are used for the display elements in the above-described embodiments and others, this is not limitative. Instead, electro luminescence (EL) elements may be used, for example.

It is possible to achieve at least the following configurations from the above-described exemplary embodiments and the modifications of the disclosure.

(1) A display panel with a touch detector, including:
a display layer including a plurality of display elements arranged side by side; and
an electrode layer alternately segmented into first regions and second regions along a first direction, the electrode layer including a plurality of first slits arranged side by side to extend in a second direction, and a plurality of second slits each allowing an adjacent pair of the plurality of first slits in the second regions to be in communication with one another.

(2) The display panel according to (1), further including a wiring layer having a plurality of signal lines extending in the first direction between the adjacent display elements arranged in the second direction, wherein
one of the second slits is provided in a region corresponding to any one of the signal lines.

(3) The display panel according to (2), wherein the one of the second slits is provided every predetermined number of the signal lines.

(4) The display panel according to (2) or (3), wherein the electrode layer further including a plurality of third slits each disposed not to allow an adjacent pair of the first slits in the first regions to be in communication with one another.

(5) The display panel according to (4), wherein one of the second slits and one of the third slits are provided in a region corresponding to any one of the signal lines.

(6) The display panel according to (4) or (5), wherein the third slits adjacent to each other in the first direction are provided at different positions in the second direction.

(7) The display panel according to (6), wherein the second slits adjacent to each other in the first direction are provided at different positions in the second direction.

(8) The display panel according to (6), wherein the second slits adjacent to each other in the first direction are provided at the same positions in the second direction.

(9) The display panel according to any one of (6) to (8), wherein
the second slits and the third slits extend in the first direction, and
a width of each of the second slits is equal to a width of each of the third slits.

(10) The display panel according to (4) or (5), wherein
the third slits adjacent to each other in the first direction are provided at the same positions in the second direction, and
the second slits adjacent to each other in the first direction are provided at the same positions in the second direction.

(11) The display panel according to (10), wherein the second slits and the third slits extend in a third direction different from the first direction.

(12) The display panel according to (10), wherein
the second slits and the third slits extend in the first direction, and
a width of each of the third slits is larger than a width of each of the second slits.

(13) The display panel according to any one of (1) to (12), wherein one of the first slits is provided for every predetermined number of the display elements in the first direction.

(14) The display panel according to (13), wherein
each of the display elements defines a display pixel including a red display element, a green display element, and a blue display element, and
the first slits are provided at positions corresponding to the blue display elements.

(15) The display panel according to any one of (1) to (14), wherein
the electrode layer includes a plurality of dummy electrodes defined by the first and second slits, and
the dummy electrodes are electrically floated.

(16) The display panel according to any one of (1) to (15), further including drive electrodes extending in a direction crossing the second direction, wherein
the electrode layer includes detection electrodes including a plurality of electrode patterns defined by the first slits in the first regions, and
each of intersections between the detection electrodes and the drive electrodes has capacitance.

(17) The display panel according to (16), wherein each of the display elements includes
a liquid crystal layer, and
pixel electrodes provided between the liquid crystal layer and the drive electrodes, or disposed to face the liquid crystal layer with the drive electrodes in between.

(18) The display panel according to (16), wherein each of the display elements includes
a liquid crystal layer, and
pixel electrodes disposed to face the drive electrodes with the liquid crystal layer in between.

(19) A touch panel including:
an electrode layer alternately segmented into first regions and second regions along a first direction, the electrode layer including a plurality of first slits arranged side by side to extend in a second direction, and a plurality of second slits allowing the adjacent first slits in the second regions to be in communication with one another.

(20) An electronic unit including a display panel with a touch detector, and a control section that performs operation control using the display panel with a touch detector, the display panel including:
a display layer including a plurality of display elements arranged side by side, and
an electrode layer alternately segmented into first regions and second regions along a first direction, the electrode layer including a plurality of first slits arranged side by side to extend in a second direction, and a plurality of second slits each allowing an adjacent pair of the plurality of first slits in the second regions to be in communication with one another.

It should be understood by those skilled in the art that various modifications, combinations, sub-combinations and alterations may occur depending on design requirements and other factors insofar as they are within the scope of the appended claims or the equivalents thereof.

What is claimed is:

1. A display panel with a touch detector, comprising:
    a display layer including a plurality of display elements arranged side by side;
    an electrode layer extending in a first direction and a second direction crossing the first direction;
    a touch detection electrode, which has only a single opening having a closed outline and which extends in the second direction, a plurality of the touch detection electrodes being arranged in the first direction;
    a plurality of dummy electrodes disposed in the single opening of the respective touch detection electrode, wherein the dummy electrodes in the opening of the touch detection electrode are arranged in the first direction and the second direction;
    a plurality of first slits each disposed between the dummy electrodes adjacent in the first direction; and
    a plurality of second slits each disposed between the dummy electrodes adjacent in the second direction.

2. The display panel with a touch detector according to claim 1, wherein
    the display panel has a display region and a frame region around the display region in a plan view,
    the touch detection electrode extends over the frame region and the display region in the second direction.

3. The display panel with a touch detector according to claim 1, wherein
    no dummy electrode is arranged between the adjacent two touch detection electrodes.

4. The display panel according to claim 1, further comprising a wiring layer having a plurality of signal lines extending in the first direction between the adjacent display elements arranged in the second direction, wherein one of the second slits is provided in a region corresponding to anyone of the signal lines.

5. The display panel according to claim 4, wherein the one of the second slits is provided every predetermined number of the signal lines.

6. The display panel according to claim 4, wherein the electrode layer further including a plurality of third slits, and each of the third slits intersects with only one of the first slits.

7. The display panel according to claim 6, wherein one of the second slits and one of the third slits are provided in a region corresponding to anyone of the signal lines.

8. The display panel according to claim 7, wherein the third slits adjacent to each other in the first direction are provided at different positions in the second direction.

9. The display panel according to claim 8, wherein the second slits adjacent to each other in the first direction are provided at different positions in the second direction.

10. The display panel according to claim 8, wherein the second slits adjacent to each other in the first direction are provided at the same positions in the second direction.

11. The display panel according to claim 8, wherein
the second slits and the third slits extend in the first direction, and
a width of each of the second slits is equal to a width of each of the third slits.

12. The display panel according to claim 7, wherein
the third slits adjacent to each other in the first direction are provided at the same positions in the second direction, and
the second slits adjacent to each other in the first direction are provided at the same positions in the second direction.

13. The display panel according to claim 12, wherein the second slits and the third slits extend in a third direction different from the first direction.

14. The display panel according to claim 12, wherein
the second slits and the third slits extend in the first direction, and
a width of each of the third slits is larger than a width of each of the second slits.

15. The display panel according to claim 1, wherein one of the first slits is provided for every predetermined number of the display elements in the first direction.

16. The display panel according to claim 15, wherein
each of the display elements defines a display pixel including a red display element, a green display element, and a blue display element, and
the first slits are provided at positions corresponding to the blue display elements.

17. The display panel according to claim 1, wherein the dummy electrodes are electrically floated.

18. The display panel with a touch detector according to claim 1, wherein the dummy electrodes are disposed in a region in which the touch detection electrode is not disposed and in the single opening of the respective touch detection electrode.

19. A touch panel comprising:
an electrode layer extending in a first direction and a second direction crossing the first direction;
a touch detection electrode, which has only a single opening having a closed outline and which extends in the second direction, a plurality of the touch detection electrodes being arranged in the first direction;
a plurality of dummy electrodes disposed in the single opening of the respective touch detection electrode, wherein the dummy electrodes in the opening of the touch detection electrode are arranged in the first direction and the second direction;
a plurality of first slits each disposed between the dummy electrodes adjacent in the first direction; and
a plurality of second slits each disposed between the dummy electrodes adjacent in the second direction.

20. A display panel with a touch detector, comprising:
a display layer including a plurality of display elements arranged side by side;
an electrode layer extending in a first direction and a second direction crossing the first direction;
a touch detection electrode, which has only a single opening having a closed outline and which extends in the second direction, a plurality of the touch detection electrodes being arranged in the first direction; and
a plurality of dummy electrodes disposed in the single opening of the respective touch detection electrode, wherein the dummy electrodes are electrically floated.

* * * * *